US 8,674,929 B2

(12) United States Patent
Seo et al.

(10) Patent No.: US 8,674,929 B2
(45) Date of Patent: Mar. 18, 2014

(54) OPTICAL ASSEMBLY, BACKLIGHT UNIT INCLUDING THE SAME, AND DISPLAY APPARATUS INCLUDING THE BACKLIGHT UNIT

(75) Inventors: Buwan Seo, Pyeongtaek-si (KR);
Heesool Koo, Pyeongtaek-si (KR);
Seungse Kim, Pyeongtaek-si (KR);
Juyoung Joung, Pyeongtaek-si (KR);
Wondo Kee, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 12/966,202

(22) Filed: Dec. 13, 2010

(65) Prior Publication Data

US 2011/0141162 A1    Jun. 16, 2011

(30) Foreign Application Priority Data

Dec. 14, 2009 (KR) .................. 10-2009-0124164
Dec. 14, 2009 (KR) .................. 10-2009-0124165

(51) Int. Cl.
*G09G 3/36* (2006.01)

(52) U.S. Cl.
USPC .............................. 345/102; 349/65; 362/606

(58) Field of Classification Search
USPC .......... 345/102; 362/600, 606, 608–613, 615, 362/623; 349/61–67
See application file for complete search history.

(56) References Cited

U.S. PATENT DOCUMENTS

| 5,704,703 | A | 1/1998 | Yamada et al. ................ 362/27 |
| 5,717,422 | A | 2/1998 | Fergason .................... 345/102 |
| 6,011,602 | A | 1/2000 | Miyashita et al. ............. 349/65 |
| 6,241,358 | B1 | 6/2001 | Higuchi et al. ................ 362/31 |
| 6,456,343 | B2 | 9/2002 | Kim et al. ................... 349/58 |
| 6,816,141 | B1 | 11/2004 | Fergason .................... 345/88 |
| 7,125,152 | B2 | 10/2006 | Lin et al. .................... 362/609 |
| 7,311,431 | B2 | 12/2007 | Chew et al. .................. 362/613 |
| 7,312,838 | B2 | 12/2007 | Hwang et al. ................. 349/58 |

(Continued)

FOREIGN PATENT DOCUMENTS

| EP | 0 987 490 B1 | 3/2000 |
| JP | 64-29708 U | 2/1989 |

(Continued)

OTHER PUBLICATIONS

PCT International Search Report and Written Opinion dated Jan. 8, 2010 issued in Application No. PCT/KR2009/002782.

(Continued)

*Primary Examiner* — Regina Liang
(74) *Attorney, Agent, or Firm* — KED & Associates, LLP

(57) ABSTRACT

Provided are a backlight unit and a display apparatus including the same. The backlight unit includes a bottom cover, a substrate, light sources, light guide panels, at least one reflective member, and an optical sheet. The substrate is in the bottom cover. The light sources are on the substrate to emit light at an orientation angle from a first direction. The light guide panels include a light incident part having a light incident surface to which light is incident in the first direction from the light sources, and a light emitting part that emits the incident light in a second direction crossing the first direction and has a side connected to the light incident part. The reflective member includes a reflective region overlapping the light guide panel and an extension region that does not overlap the light guide panel. The optical sheet is above the light guide panel.

21 Claims, 19 Drawing Sheets

(56) References Cited

U.S. PATENT DOCUMENTS

| | | |
|---|---|---|
| 7,413,330 B2 | 8/2008 | Furukawa ............... 362/600 |
| 7,641,375 B2 | 1/2010 | Fujita et al. ............ 362/617 |
| 7,855,391 B2 | 12/2010 | Park et al. ............... 257/98 |
| 8,071,997 B2 | 12/2011 | Scotch et al. ........... 257/99 |
| 8,113,704 B2 | 2/2012 | Bae et al. ............... 362/613 |
| 8,192,056 B2 | 6/2012 | Villard .................... 362/294 |
| 2001/0017774 A1 | 8/2001 | Ito et al. ................. 362/31 |
| 2003/0206253 A1 | 11/2003 | Cho ........................ 349/61 |
| 2003/0231483 A1 | 12/2003 | Higashiyama ........... 362/31 |
| 2004/0130885 A1* | 7/2004 | Nakano .................... 362/31 |
| 2005/0248939 A1 | 11/2005 | Li et al. .................. 362/225 |
| 2005/0276075 A1 | 12/2005 | Chen et al. .............. 362/615 |
| 2006/0044830 A1 | 3/2006 | Inoue et al. ............. 362/614 |
| 2006/0114690 A1 | 6/2006 | Iki et al. ................. 362/612 |
| 2006/0209564 A1 | 9/2006 | Lin et al. ................ 362/609 |
| 2006/0221638 A1 | 10/2006 | Chew et al. ............. 362/613 |
| 2006/0239033 A1 | 10/2006 | Jung et al. .............. 362/612 |
| 2006/0245213 A1 | 11/2006 | Beil et al. ............... 362/616 |
| 2007/0019419 A1 | 1/2007 | Hafuka et al. ........... 362/373 |
| 2007/0058390 A1 | 3/2007 | Sugawara et al. ........ 356/560 |
| 2007/0076434 A1 | 4/2007 | Uehara et al. ........... 362/616 |
| 2007/0247869 A1 | 10/2007 | Lang et al. .............. 362/612 |
| 2007/0247871 A1 | 10/2007 | Yoo ........................ 362/612 |
| 2008/0043171 A1 | 2/2008 | Takahashi et al. ........ 349/65 |
| 2008/0205080 A1 | 8/2008 | Erchak et al. ........... 362/613 |
| 2009/0190072 A1 | 7/2009 | Nagata et al. ............ 349/96 |
| 2009/0303410 A1 | 12/2009 | Murata et al. ........... 349/58 |
| 2010/0046201 A1 | 2/2010 | Wang et al. ............. 362/97.1 |
| 2010/0149836 A1 | 6/2010 | Hung et al. ............. 362/634 |
| 2011/0051045 A1 | 3/2011 | Hur et al. ............... 349/65 |

FOREIGN PATENT DOCUMENTS

| | | |
|---|---|---|
| JP | 01-261692 A | 10/1989 |
| JP | 08-160425 A | 6/1996 |
| JP | 09-171111 A | 6/1997 |
| JP | 09-186825 A | 7/1997 |
| JP | 09-292531 A | 11/1997 |
| JP | 11-288611 A | 10/1999 |
| JP | 2002-228844 A | 8/2002 |
| JP | 2004-206916 A | 7/2004 |
| JP | 2005-259361 A | 9/2005 |
| JP | 2005-317480 A | 11/2005 |
| JP | 2006-054410 A | 2/2006 |
| JP | 2006-108033 A | 4/2006 |
| JP | 2006-0134748 A | 5/2006 |
| JP | 2006-269364 A | 10/2006 |
| JP | 2006-286638 A | 10/2006 |
| JP | 2007-250197 A | 9/2007 |
| JP | 2007-250979 A | 9/2007 |
| JP | 2007-265837 A | 10/2007 |
| JP | 2007-293339 A | 11/2007 |
| JP | 2008-108622 A | 5/2008 |
| JP | 2008-108623 A | 5/2008 |
| JP | 2008-192395 A | 8/2008 |
| JP | 2009-054990 A | 3/2009 |
| KR | 10-2001-0012532 A | 2/2001 |
| KR | 10-2001-0085460 A | 9/2001 |
| KR | 10-2003-016631 A | 3/2003 |
| KR | 10-2005-0067858 A | 7/2005 |
| KR | 10-2005-0067903 A | 7/2005 |
| KR | 10-2005-0112661 A | 12/2005 |
| KR | 10-2006-0106774 A | 10/2006 |
| KR | 10-2007-0001657 A | 1/2007 |
| KR | 10-2007-002920 A | 1/2007 |
| KR | 10-2007-0029365 A | 3/2007 |
| KR | 10-2007-0104149 A | 10/2007 |
| KR | 10-2008-0070214 A | 7/2008 |
| KR | 10-2008-0078210 A | 8/2008 |
| KR | 10-2009-0022350 A | 3/2009 |
| KR | 10-2009-0040673 A | 4/2009 |
| KR | 10-2009-0109766 A | 10/2009 |
| WO | WO 2009/017067 A1 | 2/2009 |
| WO | WO 2010/038516 A1 | 4/2010 |

OTHER PUBLICATIONS

Korean Office Action dated Feb. 22, 2010 issued in Application No. 10-2008-0061487.
PCT International Search Report and Written Opinion dated Jun. 23, 2010 issued in Application No. PCT/KR2009/005992.
U.S. Office Action dated Sep. 7, 2010 issued in U.S. Appl. No. 12/618,603.
PCT International Search Report dated Sep. 30, 2010 issued in Application No. PCT/KR2010/001067.
PCT International Search Report dated Sep. 30, 2010 issued in Application No. PCT/KR2010/001420.
PCT International Search Report dated Oct. 27, 2010 issued in Application No. PCT/KR2010/001492.
PCT International Search Report dated Oct. 28, 2010 issued in Application No. PCT/KR2010/001422.
PCT International Search Report dated Oct. 28, 2010 issued in Application No. PCT/KR2010/001423.
PCT International Search Report dated Oct. 28, 2010 issued in Application No. PCT/KR2010/001424.
PCT International Search Report dated Oct. 28, 2010 issued in Application No. PCT/KR2010/001425.
PCT International Search Report dated Oct. 29, 2010 issued in Application No. PCT/KR2010/001485.
Korean Office Action dated Dec. 21, 2010 issued in Application No. 10-2008-0049146.
Korean Office Action dated Dec. 21, 2010 issued in Application No. 10-2008-0099569.
U.S. Office Action dated Feb. 1, 2012 issued in U.S. Appl. No. 12/632,694.
United States Notice of Allowance dated Apr. 4, 2012 issued in U.S. Appl. No. 12/768,982.
Final Office Action dated Feb. 17, 2011 issued in U.S. Appl. No. 12/618,603.
U.S. Office Action dated May 25, 2011 issued in U.S. Appl. No. 12/453,885.
United States Office Action dated Jun. 13, 2012 issued in U.S. Appl. No. 12/728,065.
United States Notice of Allowance dated Jul. 12, 2012 issued in U.S. Appl. No. 12/728,001.
European Search Report dated Apr. 26, 2011 issued in Application No. 10 01 5492.
United States Office Action dated Sep. 6, 2012 issued in U.S. Appl. No. 12/728,087.
United States Office Action dated Sep. 26, 2012 issued in U.S. Appl. No. 12/728,111.
United States Office Action dated Sep. 27, 2012 issued in U.S. Appl. No. 12/728,131.
Korean Notice of Allowance dated Aug. 30, 2011 issued in Application No. 10-2008-0049146 (English translation).
European Search Report dated Aug. 30, 2011 issued in Application No. 09 75 5013.
U.S. Office Action dated Oct. 25, 2011 issued in U.S. Appl. No. 12/727,966.
Korean Office Action dated Apr. 9, 2010 issued in Application No. 10-2009-0113708.
Korean Office Action dated Oct. 11, 2010 issued in Application No. 10-2009-0053260.
International Search Report dated Oct. 27, 2010 issued in Application No. PCT/KR2010/001963.
United States Final Office Action dated Nov. 3, 2011 issued in U.S. Appl. No. 12/453,885.
Korean Notice of Allowance dated Nov. 30, 2011 issued in Application No. 10-2008-0049146 (with English translation).

* cited by examiner

OPTICAL ASSEMBLY, BACKLIGHT UNIT INCLUDING THE SAME, AND DISPLAY APPARATUS INCLUDING THE BACKLIGHT UNIT

CROSS-REFERENCE TO RELATED APPLICATIONS

The present application claims priority under 35 U.S.C. 119 and 35 U.S.C. 365 to Korean Patent Application Nos. 10-2009-0124164(filed on 14 Dec. 2009) and 10-2009-0124165(filed on 14 Dec. 2009), which are hereby incorporated by reference in its entirety.

BACKGROUND

The present disclosure relates to a backlight unit and a display apparatus including the backlight unit.

As our information society develops, needs for diverse forms of display apparatuses are increasing. Accordingly, research has been carried out on various display apparatuses such as liquid crystal display devices (LCDs), plasma display panels (PDPs), electro luminescent displays (ELDs), and vacuum fluorescent displays (VFDs), which have been commercialized.

Of these, an LCD has a liquid crystal panel that includes a liquid crystal layer, a thin film transistor (TFT) substrate, and a color filter substrate facing the TFT substrate with the liquid crystal layer therebetween. Such a liquid crystal panel, having no light source, uses light provided by a backlight unit to display an image.

SUMMARY

Embodiments provide a backlight unit and a display apparatus including the backlight unit, which improve quality of a display image.

In one embodiment, a backlight unit includes: a bottom cover; a substrate accommodated in the bottom cover; a plurality of light sources arrayed on the substrate to emit light at a predetermined orientation angle from a first direction; a plurality of light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part, at least one reflective member including a reflective region overlapping one of the light guide panels and an extension region that does not overlap the light guide panel; and an optical sheet disposed above the light guide panel.

In another embodiment, a backlight unit includes: one or more optical sheets; a plurality of optical assemblies under the optical sheet; and a bottom cover to which the optical sheet is fixed, the bottom cover accommodating the optical assemblies, wherein the optical assembly includes: a substrate; a plurality of light sources arrayed on the substrate to emit light at a predetermined orientation angle from a first direction; one or more light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part; and a reflective member under the light guide panel, the reflective member including a reflective region that overlaps the light guide panel and an extension region that does not overlap the light guide panel, wherein a border of the light guide panel provided to one of the optical assemblies is spaced a predetermined distance from a border of the light guide panel provided to another optical assembly adjacent to the optical assembly, and at least one portion of the extension region of the reflective member provided to one of the optical assemblies is disposed within the predetermined distance, and another portion of the extension region overlaps at least one portion of the reflective member of another optical assembly adjacent to the optical assembly.

In further another embodiment, a display apparatus includes: a display panel; a backlight unit on a rear surface of the display panel, the backlight unit being divided into a plurality of blocks that are allowed to be separately driven; and a driving part disposed behind the backlight unit to drive at least one of the display panel and the backlight unit, wherein the backlight unit includes: a bottom cover; a substrate accommodated in the bottom cover; a plurality of light sources arrayed on the substrate to emit light at a predetermined orientation angle from a first direction; a plurality of light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part; at least one reflective member including a reflective region overlapping one of the light guide panels and an extension region that does not overlap the light guide panel; and an optical sheet disposed above the light guide panel.

The details of one or more embodiments are set forth in the accompanying drawings and the description below. Other features will be apparent from the description and drawings, and from the claims.

DETAILED DESCRIPTION OF THE EMBODIMENTS

Figure 1:
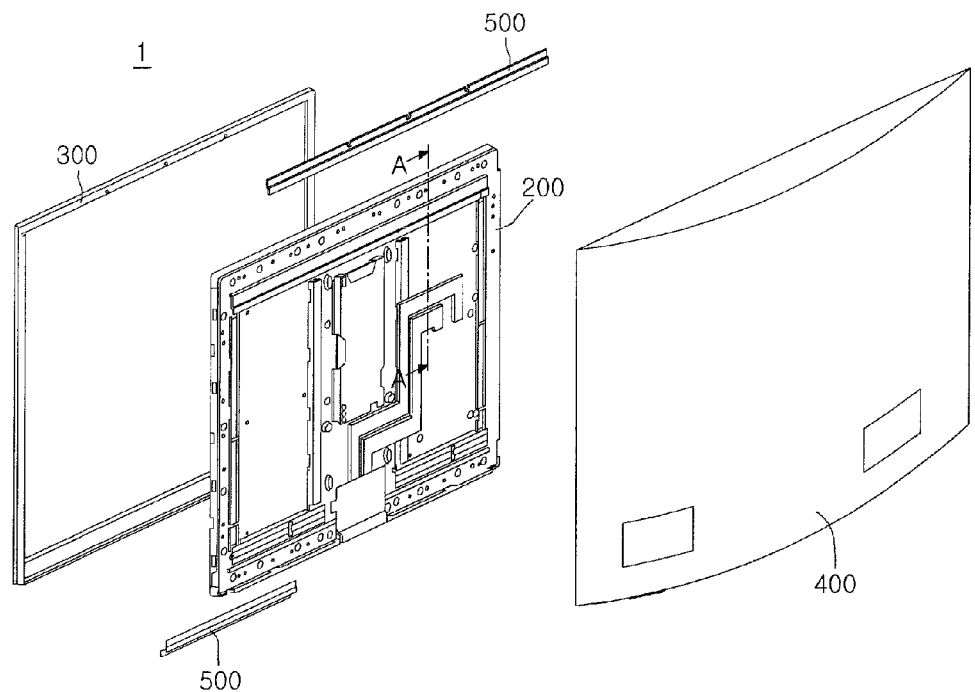
FIG. 1 is an exploded perspective view illustrating a display apparatus according to an embodiment.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. In the drawings, the shapes and sizes of elements are exaggerated for clarity.

FIG. 1 is an exploded perspective view illustrating a display apparatus 1 according to an embodiment.

Referring to FIG. 1, the display apparatus 1 includes a display module 200, a front cover 300 and a back cover 400 that surround the display module 200, and a fixing member 500 for fixing the display module 200 to at least one of the front cover 300 and the back cover 400.

A portion of the fixing member 500 is fixed to the front cover 300 through a coupling member such as a screw, and then, another portion of the fixing member 500 supports the display module 200 with respect to the front cover 300, so that the display module 200 can be fixed with respect to the front cover 300.

Although the fixing member 500 has an elongated plate shape in the current embodiment, the display module 200 may be fixed to the front cover 300 or the back cover 400 through a coupling member without the fixing member 500.

Figure 2:
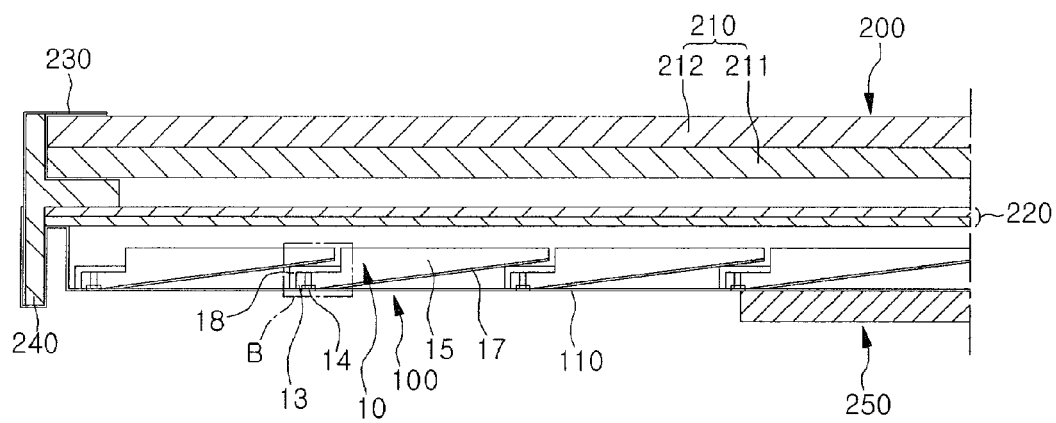
FIG. 2 is a cross-sectional view taken along line A-A of FIG. 1.

FIG. 2 is a cross-sectional view taken along line A-A of FIG. 1.

Referring to FIG. 2, the display module 200 includes a display panel 210 for displaying an image, a backlight unit 100 emitting light to the display panel 210, a bottom cover 110 providing the lower appearance of the display module 200, a panel supporter 240 supporting the display panel 210 from the lower side, a top cover 230 supporting the display panel 210 from the upper side and constituting a border of the display module 200.

The bottom cover 110 may have a box shape with an open upper surface to receive the backlight unit 100. A side of the bottom cover 110 may be fixed to a side of the top cover 230. For example, a coupling member such as a screw may pass through a side surface of the display module 200, that is, through a side where the bottom cover 110 overlaps the top cover 230 to fix the bottom cover 110 and the top cover 230.

A rear surface of the bottom cover 110 is provided with at least one substrate 250 to drive the display module 200 with a signal transmitted from the outside, e.g. an image signal.

The substrate 250 may be, e.g., a driving part of an image display and/or a backlight unit such as a timing controller, a T-con board, or a main printed circuit board (PCB), and fixed to the rear surface of the bottom cover 110 through an adhesive member or a coupling member such as a screw.

For example, the display panel 210 may include a lower substrate 211 and an upper substrate 212 attached to each other with a constant cell gap, and a liquid crystal layer interposed between the lower substrate 211 and the upper substrate 212. The lower substrate 211 is provided with a plurality of gate lines and a plurality of data lines crossing the gate lines. Thin film transistors (TFTs) may be disposed in crossing areas of the gate lines and the data lines.

The upper substrate 212 may be provided with color filters, but the structure of the display panel 210 is not limited thereto. For example, the lower substrate 211 may include color filters as well as TFTs. In addition, the structure of the display panel 210 may be varied according to a method of driving the liquid crystal layer.

Although not shown, an edge of the display panel 210 may be provided with a gate driving printed circuit board (PCB) supplying scan signals to the gate lines, and a data driving PCB supplying data signals to the data lines. At least one of the upper and lower sides of the display panel 210 may be provided with a polarized light filter (not shown).

The backlight unit 100 may include a plurality of optical assemblies 10 and an optical sheet 220 disposed between the optical assemblies 10 and the display panel 210. Each of the optical assemblies 10 includes a light source 13, a substrate 14, a light guide panel 15, a reflective member 17, and a fixing bracket 18.

The optical sheet 220 may be removed, and thus, the present disclosure is not limited thereto. The optical sheet 220 may include at least one of a spread sheet (not shown) and a prism sheet (not shown).

The spread sheet uniformly spreads light emitted from a light guide panel, and the spread light may be collected to the display panel 210 through the prism sheet. The prism sheet including one or more illumination enhancement films and at least one of a horizontal prism sheet and a vertical prism sheet may be selectively provided.

The types and number of optical sheets may be varied within the scope of the present disclosure.

The optical assemblies 10 are arrayed at the lower side of the display panel 210 and the optical sheet 220 and emit light upward to the display panel 210.

Figure 3:
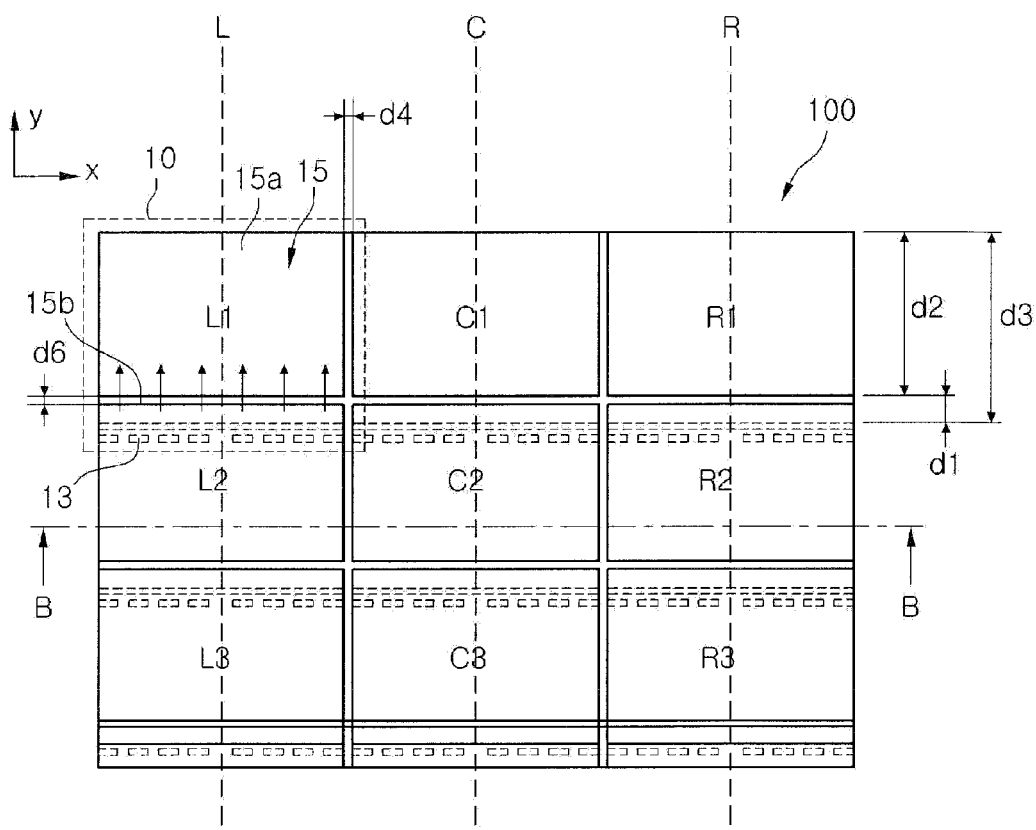
FIG. 3 is a plan view illustrating a backlight unit according to an embodiment.

FIG. 3 is a plan view illustrating the backlight unit 100.

Referring to FIG. 3, for example, the backlight unit 100 includes N light guide panels 15 (N is a natural number equal to two or greater), which are arrayed in a first direction that is a y-axis direction, and M light guide panels 15 (M is a natural number equal to two or greater), which are arrayed in a third direction that is an X-axis direction crossing the Y-axis direction on a plane for the backlight unit 100.

Since a light emitting part 15a of one of the light guide panels 15 arrayed in the first direction is disposed above a light incident part 15b of another one of the light guide panels 15, at least two of the light guide panels 15 adjacent in the first direction can partially overlap each other.

That is, a second end 156 of the light emitting part 15a of a $K^{th}$ one (K is one of 1 to N−1) of the N light guide panels 15 is disposed above the light incident part 15b of the K+1$^{th}$ light guide panel 15, so that the adjacent $K^{th}$ and K+1$^{th}$ light guide panels 15 can overlap each other in at least one portion.

The optical assemblies 10 are spaced first and second distances d6 and d4 from one another, so as to form predetermined spaces.

That is, when the optical assemblies 10 are adjacent in the first direction (y-axis direction) that is the direction of light emitted from the light sources 13, the light emitting parts 15a are spaced the first distance d6 from each other in the first direction.

That is, when the optical assemblies 10 are adjacent in the third direction (x-axis direction) crossing the first direction, the adjacent optical assemblies 10 are spaced the second distance d4 from each other.

In this case, spaces defined by the first distance d6 extend in the third direction (x-axis direction), spaces defined by the second distance d4 extend in the first direction (y-axis direction), and the spaces of the first distance d6 cross the spaces of the second distance d4.

A bright or dark line may occur in the spaces defined by the first and second distances d1 and d2 between the optical assemblies 10, more particularly, in regions 60 corresponding to borders between the adjacent light guide panels 15.

That is, as distances d1 and d2 between the adjacent light guide panels 15 decrease, the amount of light emitted to the front side through the borders increases, and the brightness of light in the regions 60 corresponding to the borders between the light guide panels 15 may increase, and thus, a bright line may occur on a display screen.

That is, as the distances d1 and d2 between the adjacent light guide panels 15 increase, the amount of light emitted to the front side through the borders decreases, and the brightness of light in the regions 60 corresponding to the borders between the light guide panels 15 may decrease, and thus, a dark line may occur on a display screen.

Thus, according to the current embodiment, the distances d4 and d6 between the adjacent light guide panels 15 may have ranges in which a bright or dark line does not occur between the borders. That is, the first and second distances d6 and d4 may range, for example, from about 0.1 mm to about 7 mm.

At least one portion of the reflective member 17 of one of the adjacent light guide panels 15 is disposed in the space between the adjacent light guide panels 15 to prevent an inner surface of the bottom cover 110 from being exposed through the space in the first direction (y-axis direction).

In the display apparatus 1, for example, the number of the optical assemblies 10 arrayed in the first direction may be three, and the number of the optical assemblies 10 arrayed in the third direction may be three, and thus, the backlight unit 100 can have a 3×3 matrix of the light guide panels 15.

Each of the optical assemblies 10 may be manufactured as a discrete assembly, and the optical assemblies 10 may be adjacent to each other to constitute a module-type backlight unit that is a backlight member configured to provide light to the display panel 210.

The backlight unit 100 may be driven using an entire driving method or a local driving method such as a local dimming method and an impulsive method. The method of driving light emitting diodes may be varied according to a circuit design, and thus is not limited. According to the embodiment, a color contrast ratio is increased, and a bright region and a dark region can be sharply expressed on a screen, thereby improving image quality.

That is, the backlight unit 100 is operated by a plurality of division driving areas corresponding to the light guide panels 15, and the brightness of the division driving area is linked with brightness corresponding to an image signal. Thus, the brightness in a dark portion of an image is decreased, and the brightness in a bright portion of the image is increased, so as to improve a contrast ratio and sharpness of the image.

The display panel 210 corresponding to the optical assembly 10 or the light guide panel 15 may be divided into two or more blocks, and the display panel 210 and the backlight unit 100 may be locally driven in a block unit.

In this case, the light guide panels 15 of the optical assemblies 10 corresponding to C1 to C3 are arrayed along a center line C of the backlight unit 100, and the light guide panels 15 corresponding to L1 to L3 and the light guide panels 15 corresponding to R1 to R3 are arrayed along the left and right lines L and R of the center line C, respectively.

In more detail, the light guide panels 15 of the backlight unit 100 may be arrayed in three rows and three columns as described above. The reflective members 17 are disposed at the lower sides respectively of the light guide panels 15 to reflect light, incident in the first direction to the light guide panel 15, in a second direction (z-axis direction) that crosses the first direction.

In this case, each of the reflective members 17 provided to the light guide panels 15 of the optical assemblies 10 corresponding to C1 to C3 arrayed on the center line C has at least one portion that extends from a border of the light guide panel 15. The extended portions of the reflective members 17 arrayed on the center line C overlap the reflective members 17 arrayed on the left line L and the right line R.

Hereinafter, the configuration of the optical assembly 10 will now be described in detail.

Figure 4:
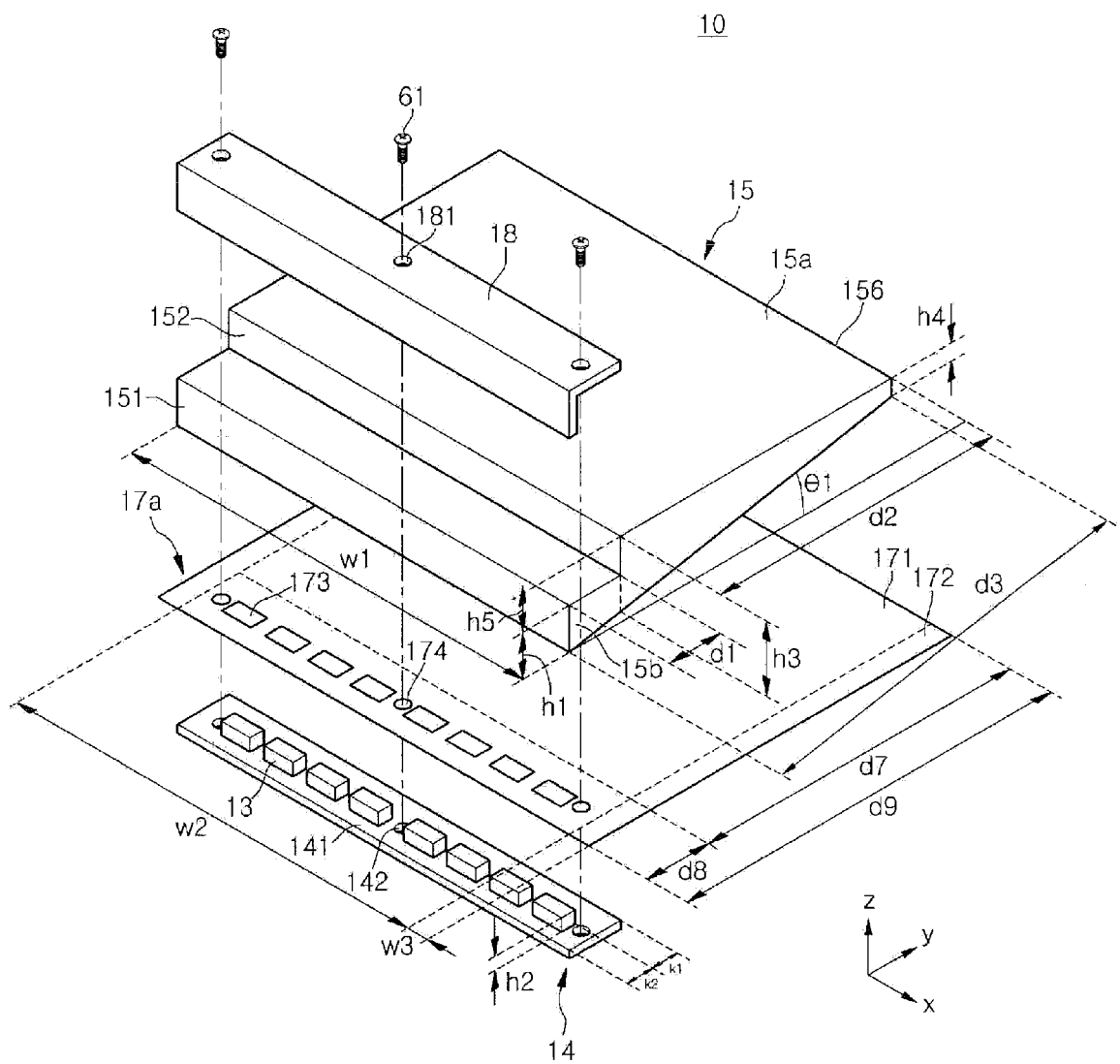
FIG. 4 is an exploded perspective view illustrating an optical assembly according to the embodiment of FIG. 1.

FIG. 4 is an exploded perspective view illustrating the optical assembly 10.

Referring to FIG. 4, the optical assemblies 10 may be arrayed with at least one portion fixed to the bottom cover 110, and each of the optical assemblies 10 may include the light source 13, the substrate 14, the light guide panel 15, the reflective member 17, and the fixing bracket 18, as described above.

The light source 13 may be provided in plurality. The light source 13 is disposed in the third direction (x-axis direction) at a side surface of the light guide panel 15. Thus, light emitted from the light source 13 is incident to the side surface of the light guide panel 15.

The light source 13 may include a light emitting diode (LED) that may be provided in plurality.

The LED may be a side illumination-type LED that is configured to laterally emit light. The LED may also be a color LED emitting at least one of red, blue, and green light, or a white LED in which a yellow fluorescent material is applied to a blue LED.

The LEDs may be disposed on the upper surface of the substrate 14, and may emit light having a wavelength ranging from about 430 nm to about 480 nm. A fluorescent material may be applied on a light emitting surface of the LED to transmit light emitted from the LED.

The color LED may include at least one of a red LED, a blue LED, and a green LED, and the arrangement and light type of the LEDs may be varied within the scope of the present disclosure.

The light sources 13 emit light at a predetermined orientation angle from the first direction.

The light sources 13 are disposed on a substrate body 141 of the substrate 14 longitudinally extending in the third direction (x-axis direction), and disposed on the rear side of the substrate body 141 in the first direction (y-axis direction).

That is, the light source 13 is mounted to a rear area k2 of the substrate body 141 in the first direction, a front area k1 is disposed in front of the rear area k2, and the front area k1 may be greater than the rear area k2.

Thus, the front area k1 has a support space with a predetermined size for supporting at least one of the light guide panel 15 and at least one of the reflective member 17. In addition, as the size of the rear area k2, just having a width for mounting the light sources 13, is decreased, a bezel area of the display module 200 where the rear area k2 is disposed, that is, the width of the border of the display module 200 may be decreased. Accordingly, the width of the rear area k2 is minimized.

In this case, the first direction (y-axis direction) may be referred to as a back-and-forth direction of the light guide panel 15, and the third direction (x-axis direction) may be referred to as a left-and-right direction of the light guide panels 15. The forward direction of the back-and-forth direction is the direction (+y-axis direction) of light emitted from the light sources 13 to the light guide panels 15, and the rearward direction thereof is the opposite direction (−y-axis direction) to the forward direction.

The substrate body 141 may include through holes 142 through which coupling members 61 pass.

The through holes 142 may be disposed between the light sources 13. According to the current embodiment, the through holes 142 are disposed in the left and right sides of the substrate body 141 and in the middle of the substrate body 141 with the four light sources 13 on each lateral side of the middle.

The coupling members 61 pass through the fixing bracket 18, the reflective member 17, and the substrate 14 to coordinate the configuration of the optical assembly 10 and to fix the optical assembly 10 to the bottom cover 110.

The light guide panel 15 may be transparent. For example, the light guide panel 15 may be formed of one of acryl-based resin such as polymethyl metaacrylate (PMMA), polyethylene terephthalate (PET), poly carbonate (PC), and polyethylene naphthalate (PEN). The light guide panel 15 may be formed using an extrusion molding method.

The light guide panel 15 diffuses light emitted from the light source 13 to guide the light upward.

More particularly, light incident forward (y-axis direction) from the light source 13, that is, laterally from the light source 13 is refracted and diffused upward (z-axis direction), that is, to the display panel 210 by the light guide panel 15. The lower surface of the light guide panel 15 is inclined upward in the forward direction to efficiently emit laterally incident light upward.

At least one of the lower surface of the light guide panel 15 is placed on and supported by the front area k1 of the substrate body 141.

The light guide panel 15 includes the light incident part 15b having a light incident surface 151 facing the light source 13, and the light emitting part 15a extending forward from the light incident part 15b.

The rear side of the light guide panel 15 where the light incident surface 151 is disposed may be referred to as a first side, and a front end 155 of the light guide panel 15 may be referred to as a second side.

A plurality of streaks of light incident from the light sources 13 into the light guide panel 15 through the light incident surface 151 are mixed into a single streak of light through the light incident part 15b, and then, the single streak of light is spread through the light emitting part 15a and emitted to the upper side of the light guide panel 15.

A first side of the light emitting part 15a is connected to a second side of the light incident part 15b. Light mixed in the light incident part 15b is emitted upward, that is, through an upper surface 153 of the light emitting part 15a.

A vertical height h2 of a light emitting surface of the light source 13 emitting light is substantially equal to or less than a vertical height h1 of the light incident surface 151 of the light incident part 15b.

That is, when the height h2 of the light sources 13 are greater than the vertical height h1 of the light incident surface 151, a portion of light emitted from the light emitting surfaces of the light sources 13 is not incident to the light incident surface 151, but may be leaked out.

Since the light sources 13 emit light, e.g. with an orientation angle of about 90° or greater, the height h1 of the light incident surface 151 is greater than the height h2 of the light sources 13.

However, when the height h1 of the light incident surface 151 is greater than two times the height h2 of the light sources 13, light leak prevention and light efficiency increase are not achieved anymore. Rather, excessive light diffusion decreases light efficiency.

Thus, according to the current embodiment, the height h1 of the light incident surface 151 is equal to the height h2 of the light sources 13, or less than two times the height h2 of the light sources 13.

The light incident part 15b extends the predetermined distance d1 in the first direction (y-axis direction), and the light emitting part 15a extends the predetermined distance d2 in the forward direction from the light incident part 15b. Thus, the back-and-forth length of the light guide panel 15 including the light incident part 15b and the light emitting part 15a is equal to a sum distance d3 of the back-and-forth lengths of the light incident part 15b and the light emitting part 15a.

A portion connecting the light incident part 15b to the light emitting part 15a is provided with a stair part due to height difference between an upper surface 152 of the light incident part 15b and the upper surface 153 of the light emitting part 15a.

At least one portion of the fixing bracket 18 is in contact with the upper surface 152 of the light incident part 15b to press the upper surface 152 of the light incident part 15b downward, that is, to the substrate body 141 and the bottom cover 110, so as to firmly fix the light guide panel 15 to the bottom cover 110.

A height h5 of the stair part is greater than or equal to a height h4 of second end 156 of the light incident part 15b.

As described above, the lower surface of the light guide panel 15 is inclined upward from the light incident part 15b to the light emitting part 15a.

Thus, the thickness of the light guide panel 15 is gradually decreased from the light incident part 15b to the light emitting part 15a.

When the height h4 of the second end 156 is greater than the height h5 of the stair part, the inclination angle of the lower surface of the light guide panel 15 is decreased. This reduces the reflectance of the light guide panel 15, thus decreasing the upward light emitting efficiency of the light emitting part 15a.

In addition, light interference occurs in which light that does not pass through the upper surface 153 of the light emitting part 15a is leaked into the adjacent light guide panel through the second end 156. Thus, the height h4 of the second end 156 of the light emitting part 15a is less than or equal to the height h5 of the stair part.

When the height h1 of the light incident surface 151 is less than the height h5 of the stair part, light traveling from the light incident part 15b to the light emitting part 15a is excessively diffused, so that a dark region is generated on the first side of the light emitting part 15a contacting the light incident part 15b. Thus, the height h1 of the light incident surface 151 is greater than or equal to the height h5 of the stair part.

From the relationship between the height h1 of the light incident surface 151 and the height h5 of the stair part, and from the relationship between the height h5 of the stair part and the height h4 of the second end 156 of the light emitting part 15a, the height h1 of the light incident surface 151 is equal to or greater than the height h4 of the second end 156.

The vertical height h1 of the light incident surface 151 of the light incident part 15b is less than a vertical height h3 of a first end of the light emitting part 15a connected to the light incident part 15b.

Thus, in the state where streaks of light incident from the light sources 13 into the light guide panel 15 through the light incident part 15b are mixed into a single streak of light, when the single streak of light travels to the first end of the light emitting part 15a having the greater cross section than that of the light incident surface 151, the single streak of light is spread more widely.

A vertical height h4 of the front end 155 of the light emitting part 15a is less than the vertical height h1 of the light incident surface 151 of the light incident part 15b, and than the vertical height h3 of the first end of the light emitting part 15a.

Thus, the vertical cross section of the light emitting part 15a of the light guide panel 15 where light incident through the light incident surface 151 is emitted upward is decreased, so as to improve upward emission of light.

The fixing bracket 18 is disposed at the first side of the light guide panel 15, that is, at the upper surface of the light incident part 15b, so as to fix the light guide panel 15 to the bottom cover 110. The fixing bracket 18 presses at least one portion of the light guide panel 15 to the bottom cover 110 to fix the light guide panel 15.

The fixing bracket 18 includes a frame structure with a bent upper portion, and may be formed of synthetic resin through injection molding, or of metal. The bent upper portion of the fixing bracket 18 is provided with through holes 181 through which the coupling members 61 pass.

When the fixing bracket 18 is fixed to the bottom cover 110 through the coupling members 61, the light sources 13 are disposed in the fixing bracket 18, thus preventing light from being emitted from the light source 13 to the outside without passing through the light guide panel 15.

Referring to FIGS. 2 to 4, when a first one of the optical assemblies 10 is adjacent to a second one of the optical assemblies 10, at least one portion of the light guide panel 15 of the first optical assembly 10 may overlap, from the upper side, the fixing bracket 18 of the second optical assembly 10.

That is, at least one portion of the light emitting part 15a of the optical assembly 10 is disposed above the fixing bracket 18 and the light incident part 15b of the adjacent optical assembly 10, so that the optical assemblies 10 overlap each other.

The display panel 210 may have a plurality of division areas corresponding to the light guide panels 15. The intensity of light emitted from the light guide panel 15 of the optical assembly 10, that is, the brightness of light emitted from the light guide panel 15 is adjusted according to a gray peak value or a color coordinate signal of the corresponding division area, so as to adjust the brightness of the display panel 210.

Referring again to FIG. 4, the lower surface of the light guide panel 15 is provided with the reflective member 17 for reflecting the light upward.

The reflective member 17 may include a reflective sheet having at least one surface coated with a reflective material to have a predetermined reflectance. The reflective member 17 includes a reflective region 171 facing the lower surface of the light guide panel 15 and having a first side contacting the second end 156 of the light guide panel 15, and a fixing region 173 disposed at a second side of the reflective region 171 to fix an installation position of the reflective member 17 on the substrate 14. In this case, a region of the reflective member 17 provided with the fixing region 173 may be referred to as a rear border of the reflective member 17, and a border opposite to the rear border may be referred to as a front border of the reflective member 17.

A length d7 of the reflective region 171 in the first direction (y-axis direction) is equal to or greater than the sum distance d3 of the light guide panel 15.

A width w2 of the reflective region 171 in the third direction (x-axis direction) is equal to or greater than a width w1 of the light guide panel 15 in the third direction.

In FIG. 4, the length d7 and the width w2 of the reflective region 171 are equal to the sum distance d3 of the lower surface of the light guide panel 15 and the width w1 of the light guide panel 15, respectively.

If the length d7 and the width w2 of the reflective region 171 are greater than the sum distance d3 of the lower surface and the width w1 of the light guide panel 15, a difference between the length d7 of the reflective region 171 and the sum distance d3 of the lower surface is smaller than the first distance d6, and a difference between the width w2 of the reflective region 171 and the width w1 of the light guide panel 15 is smaller than the second distance d4.

The fixing region 173 includes fixing holes 173 that are disposed at the second side of the reflective region 171 and have positions and shapes corresponding to the light sources 13 and receive the light sources 13 to maintain the position of the reflective member 17 on the substrate 14, and through holes 174 that are disposed between the fixing holes 173 to correspond to the through holes 142 of the substrate 14.

An extension reflective member 17a illustrated in FIG. 4 is provided to the optical assemblies 10 arrayed on the center line C, and includes extension regions 172 at the left and right sides of the reflective region 171.

The optical assemblies 10 arrayed on the left and right lines L and R except for the center line C include a non-extension reflective member 17b (refer to FIG. 6) that does not include the extension regions 172, unlike the extension reflective member 17a.

In this case, the reflective region 171 disposed at the lower side of the light guide panel 15 and overlapping the light guide panel 15 may be referred to as a first region, and the extension regions 172 that do not overlap the light guide panel 15 may be referred to as second regions.

Hereinafter, the extension reflective member of 17a and the non-extension reflective member 17b corresponding to the extension reflective member 17a will now be described in detail.

Figure 5:
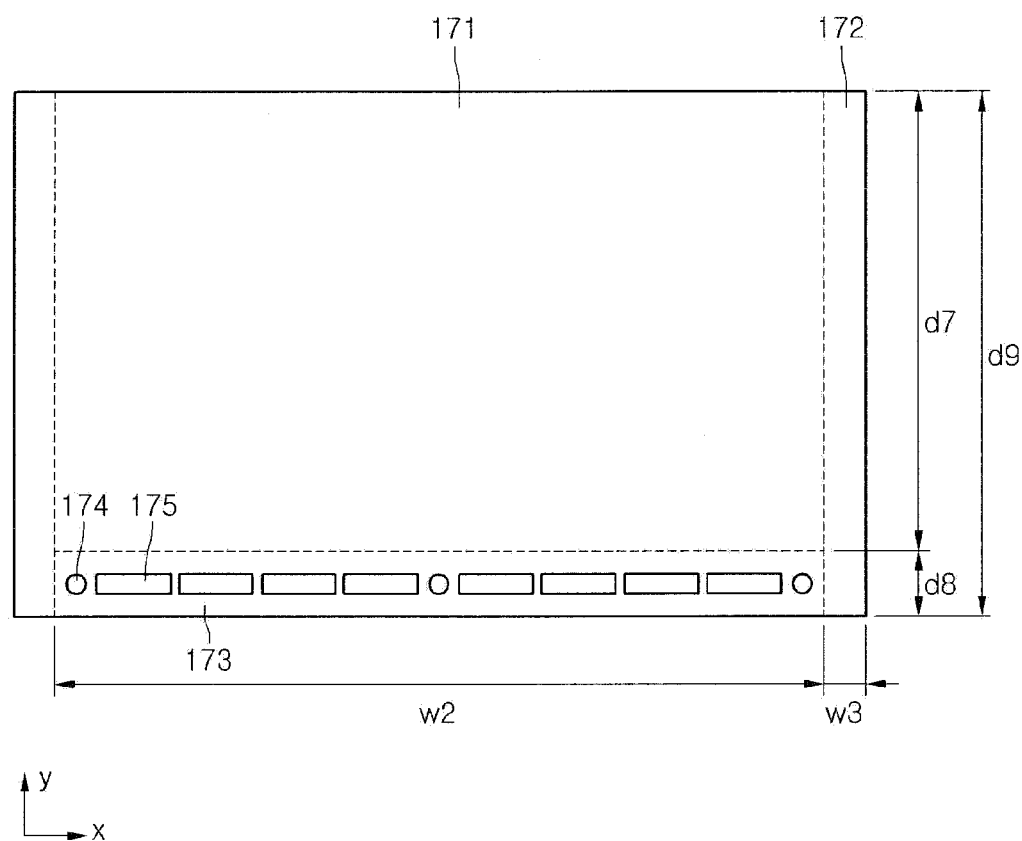
FIG. 5 is a schematic view illustrating an extension reflective member according to the embodiment of FIG. 1.
Figure 6:
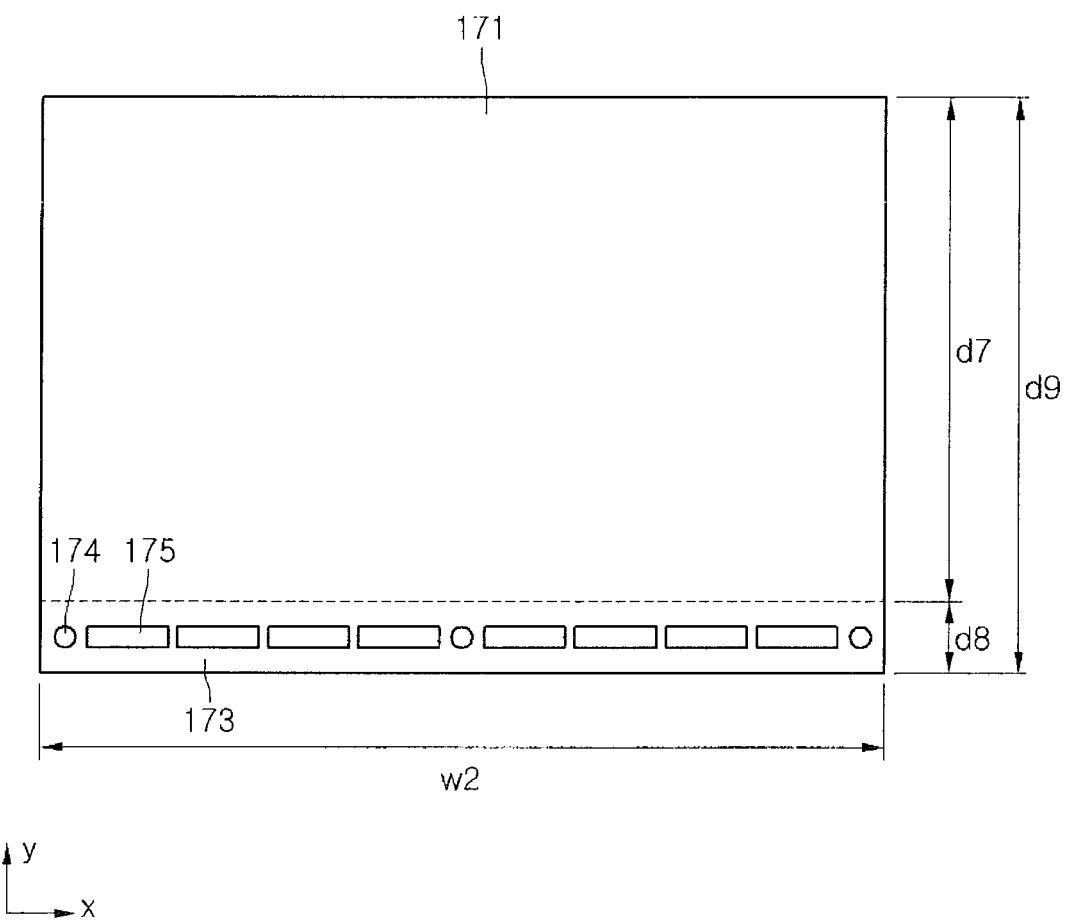
FIG. 6 is a schematic view illustrating a non-extension reflective member according to the embodiment of FIG. 1.

FIG. 5 is a schematic view illustrating the extension reflective member 17a, and FIG. 6 is a schematic view illustrating the non-extension reflective member 17b.

Referring to FIG. 5, the extension reflective member 17a includes the extension regions 172 as described above.

In more detail, the extension regions 172 of the extension reflective member 17a are provided in a pair respectively at the left and right sides of the reflective region 171.

A width w3 of the extension region 172 in the third direction (x-axis direction) is greater than the second distance d4. In the current embodiment, for example, the width w3 may range from about 0.15 mm to about 100 mm.

That is, when the reflective region 171 of the extension reflective member 17a is disposed on the lower surface of the light guide panel 15, the left and right sides of the reflective region 171, that is, the extension regions 172 extending the width w3 in the third direction (x-axis direction) protrude from borders of the light guide panel 15 to the exterior thereof. The extension regions 172 are exposed within the second distance d4 in the first direction (y-axis direction).

Since the width w3 of the extension regions 172 in the third direction (x-axis direction) is greater than the second distance d4, the extension regions 172 of the extension reflective members 17a arrayed on the center line C at least partially overlap the optical assemblies 10 arrayed on the left and right lines L or R.

In this case, a length of the extension regions 172 in the first direction (y-axis direction) may be equal to a length of the reflective region 171 in the first direction.

A width of the extension reflective member 17a in the third direction is equal to the sum of the width w2 of the reflective region 171 and the widths w3 of the extension regions 172 at the left and right sides.

Referring to FIG. 6, the non-extension reflective member 17b does not include the extension region 172, unlike the extension reflective member 17a as described above.

Thus, a width of the non-extension reflective member 17b in the third direction is equal to the width w2 of the reflective region 171, and the left and right borders of the non-extension reflective member 17b may contact the left and right borders of the light guide panel 15, or be disposed in the spaces defined by the second distance d4.

Figure 7:
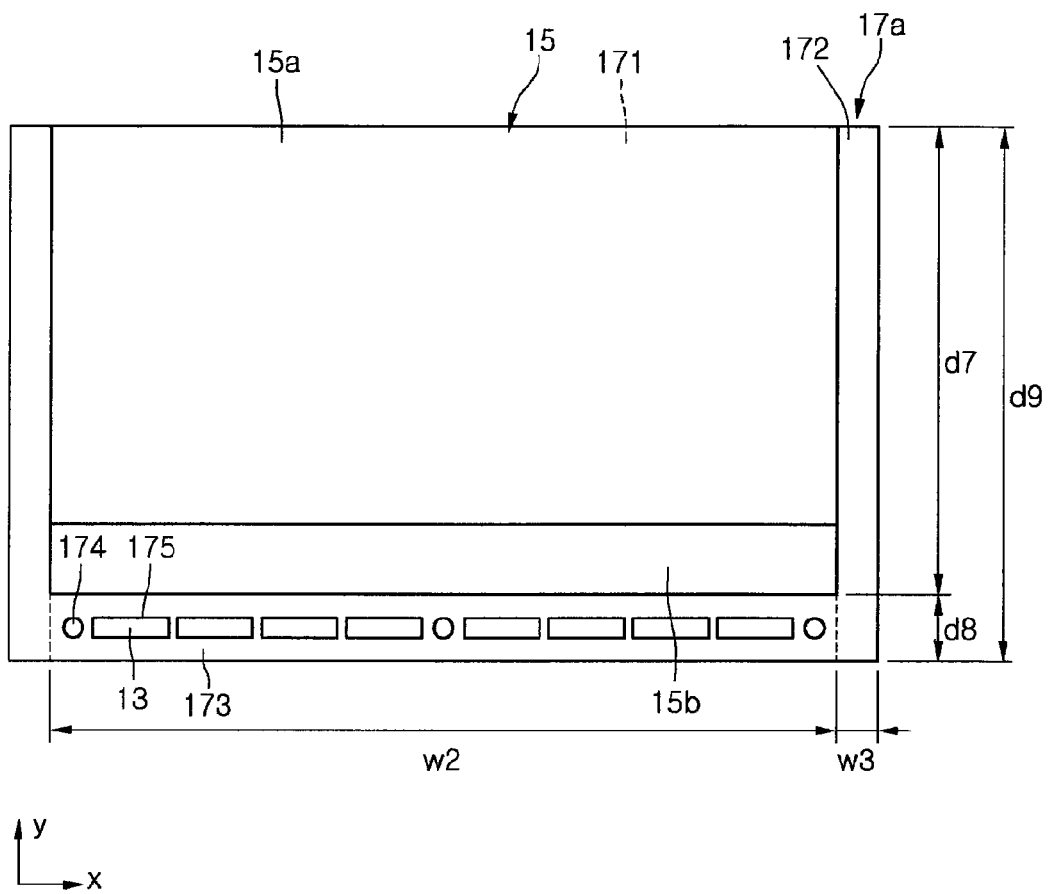
FIG. 7 is a plan view illustrating the extension reflective member installed on a light guide panel and a substrate according to the embodiment of FIG. 1.

FIG. 7 is a plan view illustrating the extension reflective member 17a installed on the light guide panel 15 and the substrate 14.

Referring to FIG. 7, when the extension reflective member 17a is installed on the light guide panel 15 and the substrate 14, the reflective region 171 of the extension reflective member 17a is disposed on the lower surface of the light guide panel 15 to overlap it.

The extension regions 172 of the extension reflective member 17a extend the width w3 from the borders of the light guide panel 15 to the exterior thereof, and thus, do not overlap the light guide panel 15.

Hereinafter, a relative arrangement between the extension reflective member 17a and the non-extension reflective member 17b will now be described in detail.

Figure 8:
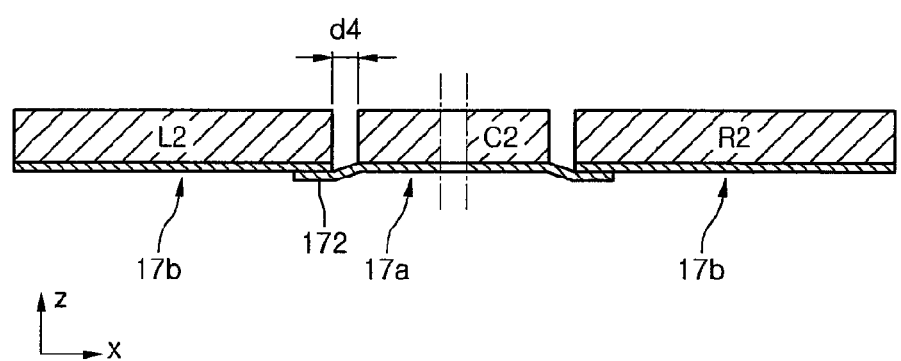
FIG. 8 is a cross-sectional view taken along line B-B of FIG. 3.

FIG. 8 is a cross-sectional view taken along line B-B of FIG. 3.

Referring to FIG. 8, the extension reflective member 17a is disposed on the lower surface of the light guide panel 15 corresponding to C2 on the center line C, and the non-extension reflective members 17b are disposed on the lower surfaces of the light guide panels 15 corresponding to L2 and R2 respectively on the left and right lines L and R.

Thus, at least one portion of the extension regions 172 of the extension reflective member 17a disposed on the lower surface of the light guide panel 15 corresponding to C2 are disposed under the reflective regions 171 of the non-extension reflective members 17b corresponding to L2 and R2, and thus, overlaps at least one portion of the non-extension reflective members 17b.

That is, at least one portion of the extension regions 172 is disposed under borders of the light guide panels 15 corresponding to L2 and R2.

The rest of the extension regions 172 is disposed in the spaces defined by the second distance d4 to reflect light, which is incident to the spaces defined by the second distance d4 along the borders of the light guide panels 15, in the second direction (z-axis direction).

In this case, one portion of the extension region 172 overlapping at least one portion of the adjacent non-extension reflective member 17b may be referred to as an overlap region 1721, and the rest of the extension region 172 may be referred as a non-overlap region 1722.

The non-overlap region 1722 is disposed in the space defined by the second distance d4 and is exposed in the first direction (y-axis direction), and the overlap region 1721 is disposed at the lower side of the adjacent non-extension reflective member 17b.

The optical assembly 10 disposed on the center line C may be installed first on the backlight unit 100, and then, the optical assembly 10 disposed on the left or right line L or R is installed, so that the extension regions 172 of the extension reflective member 17a disposed on the center line C can be disposed at the lower side of the optical assemblies 10 disposed on the left and right lines L and R.

The number of the optical assemblies 10 arrayed on each of the center line C, the left line L, and the right line R is three in the current embodiment, but the number of rows or columns of the optical assemblies 10 is not limited thereto. In this case, an arrangement of the extension reflective member 17a and the non-extension reflective member 17b may depend on an arrangement of the optical assemblies 10.

For example, when the number of lines of the optical assemblies 10 arrayed in the third direction (x-axis direction) is four, each of the extension reflective members 17a may include only one of the extension regions 172, and the extension reflective members 17a may be provided to the optical assemblies 10 on the first to third lines, and the extension region 172 of one of the optical assemblies 10 overlaps the reflective region 171 of another one, and the non-extension reflective member 17b may be provided to the optical assembly 10 on the fourth line.

According to the embodiment, since the module-type backlight unit including the light guide panels is used to provide light to the display panel, the display apparatus is slimmed, and the local driving method such as the local dimming method and the impulsive method is used to improve the contrast ratio of a display image.

In addition, since the reflective member of one optical assembly at least partially overlap the reflective member of another one, light emitted from the optical assemblies can be uniformly and continuously reflected.

In addition, since at least one portion of the overlapped reflective member is disposed under another reflective member, a mechanical interference is minimized between the reflective members, and thus, the deformation thereof can be minimized.

Figure 9:
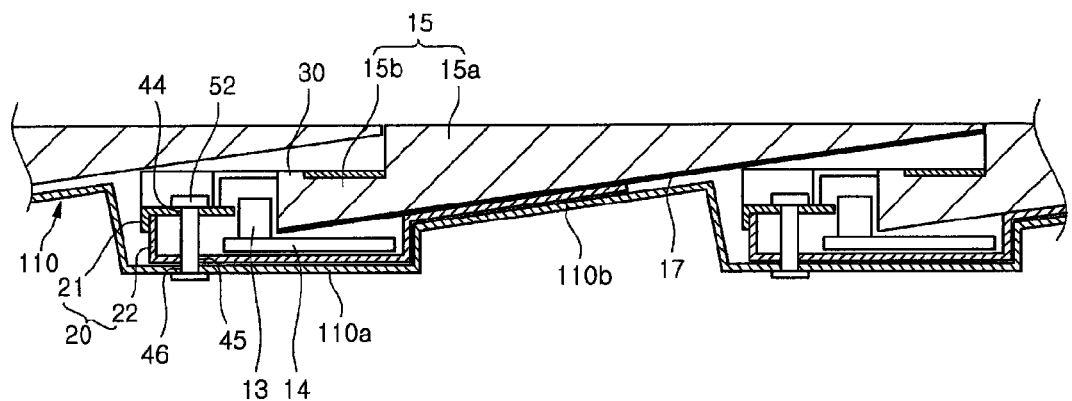
FIG. 9 is a cross-sectional view illustrating a backlight unit according to an embodiment.
Figure 10:
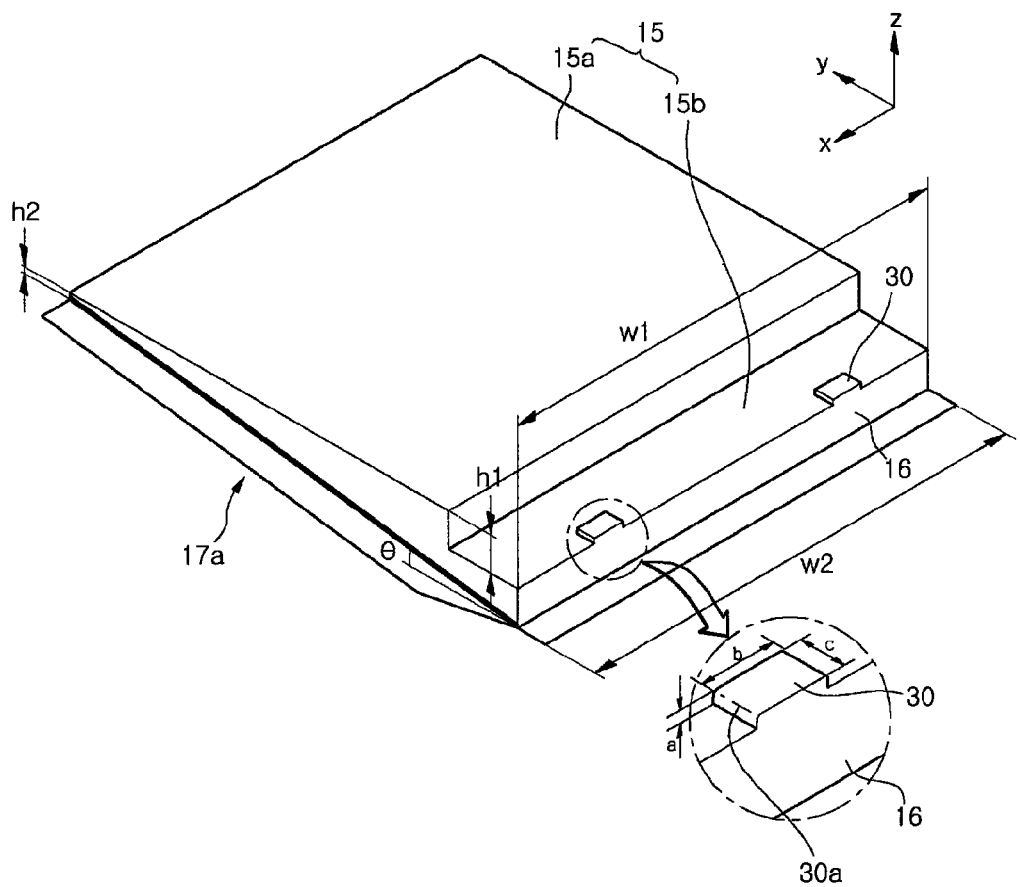
FIG. 10 is a perspective view illustrating a light guide panel and an extension reflective member of FIG. 9.
Figure 11:
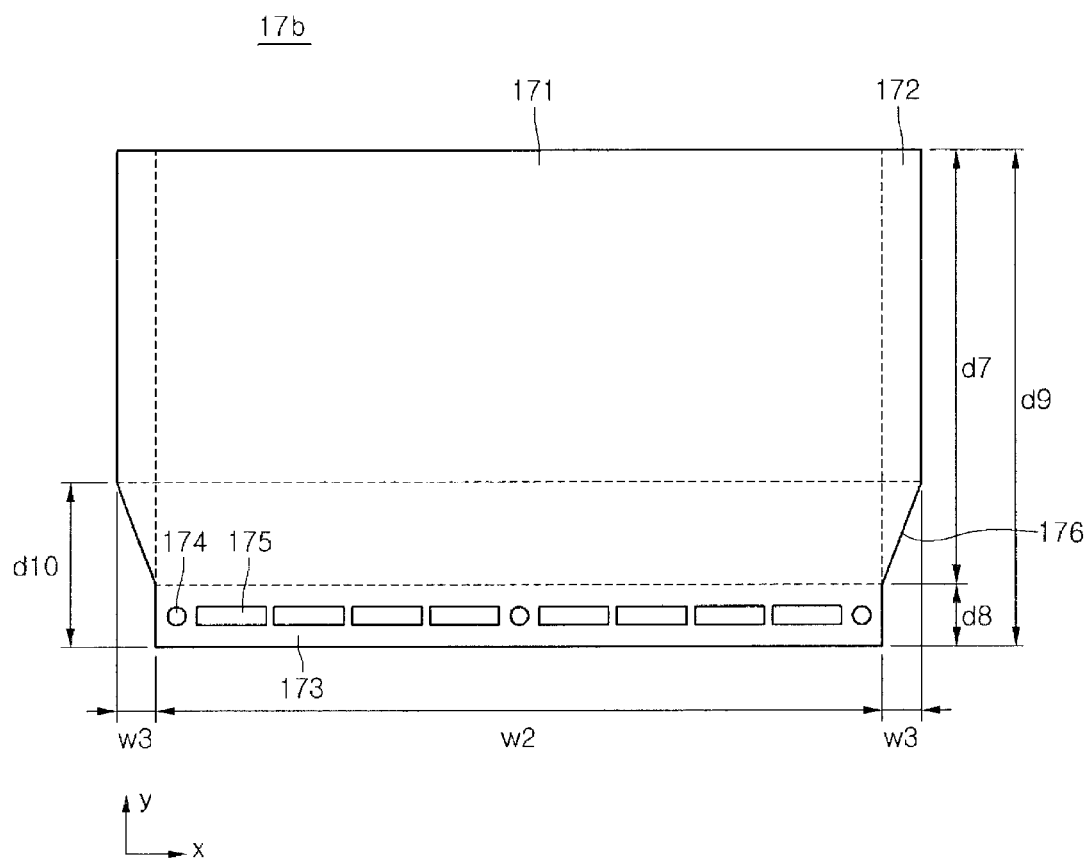
FIG. 11 is a plan view illustrating a reflective member according to the embodiment of FIG. 9.

FIG. 9 is a cross-sectional view illustrating a backlight unit according to an embodiment. FIG. 10 is a perspective view illustrating a light guide panel and an extension reflective member of FIG. 9. FIG. 11 is a plan view illustrating a reflective member according to the current embodiment.

In FIGS. 9 and 10, a description of the same part as those of FIGS. 1 to 8 will be omitted.

Referring to FIGS. 9 and 10, the optical assembly 10 may include the light source 13, the light guide panel 15, the reflective member 17, and a side cover 20 for fixing the light source 13 and the light guide panel 15.

The side cover 20 provides a fixing position with respect to the bottom cover 110 and surrounds the light source 13 and a portion of the light guide panel 15. The light source 13 is disposed in the side cover 20.

The side cover 20 may include a first side cover 21 disposed on the light source 13 and the light incident part 15b of the light guide panel 15, and a second side cover 22 disposed under the light incident part 15b. The side cover 20 may be formed of plastic or metal.

The first side cover 21 is coupled to the second side cover 22 through a first fixing member 61 to prevent the shaking of the light source 13 and the light guide panel 15 due to external shock, and particularly, prevent the shaking in the second direction (z-axis direction).

The second side cover 22 supports the inclined surface of the light guide panel 15 to firmly maintain alignment of the light guide panel 15 with the light source 13 and protect the light guide panel 15 and the light source 13 from external shock.

The light incident part 15b of the light guide panel 15 may include a protrusion 30 protruding with a predetermined height 'a'. The protrusion 30 may be provided to at least two points in the third direction (x-axis direction) on the upper surface of the light incident part 15b of the light guide panel 15.

The shape of the protrusion 30 may be varied. For example, the protrusion 30 may have a rectangular parallelepiped shape. The protrusions 30 are caught by the first side cover 21 to prevent the shaking of the light guide panel 15 in the third direction (x-axis direction) and the first direction (the y-axis direction).

An edge 30a of the protrusion 30 may be rounded to prevent a case that a crack is formed at the protrusion 30 by shock due to the movement of the light guide panel 15.

The height 'a' of the protrusion 30 may range from about 0.3 to 0.6 mm from the upper surface of the first part light incident part 15b. The protrusion 30 may have a width 'b' ranging from about 2 to 5 mm in the third direction (x-axis direction). The protrusion 30 may have a width 'c' ranging from about 1 to 3 mm in the first direction (y-axis direction).

The protrusion 30 may be disposed between neighboring LEDs 11 and adjacent to a light incident surface 16 on the upper surface of the light incident part 15b, so as to prevent optical interference of light emitted from the LEDs 11 due to the protrusion 30 integrally formed with the light guide panel 15.

The LEDs 11 may be spaced a predetermined distance from each other. The LEDs 11 may be disposed in an oblique direction with respect to the protrusion 30 to minimize optical effect due to the protrusion 30 of the light guide panel 15. Accordingly, the distance between the LEDs 11 around the protrusion 30 may be greater than the distance between the other LEDs 11.

The distance between a portion of the LEDs 11 may be greater than the distance between the other LEDs 11 to secure a coupling space of the first side cover 21 and the second side cover 22 and minimize optical effect due to coupling force for pressing the light guide panel 15.

The first side cover 21 may have first holes 41 at positions corresponding to the protrusions 30 of the light incident part 15b.

The first holes 41 may be larger than the protrusions such that the protrusions 30 are fitted and caught to the first holes 41. The protrusion 30 disposed in the first hole 41 partially has a predetermined gap that may be a margin for preventing the torsion of the light guide panel 15 when the light guide panel 15 is expanded by environmental change such as sharp temperature increase. In this case, the rest of the protrusion 30 without the predetermined gap may be in contact with the first side cover 21 to increase fixing force thereof.

At least one second hole 42 may be further disposed in the first side cover 21. The second side cover 22 may have at least one third hole 43 at a position corresponding to the second hole 42.

The backlight unit 100 configured as described above may be disposed in the bottom cover 110 having a box shape with an open top.

The bottom surface of the bottom cover 110 on which the optical assembly 10 is placed may be formed in a concave-convex structure to conform with the bottom surface of the optical assembly 10.

For example, a structure including the light source 13, the light incident part 15b of the light guide panel 15, and the side cover 20 may be disposed on a recess part 110a of the bottom surface of the bottom cover 110, the light emitting part 15a of the light guide panel 15 may be disposed on a protrusion part 110b of the bottom surface. The recess part 110a and the protrusion part 110b may be alternately and continuously arrayed.

The bottom cover 110 may be manufactured through a process such as press molding or extrusion molding.

The shapes of the recess part 110a and the protrusion part 110b depend on the size and appearance of the optical assembly 10, and accommodate the optical assembly 10 and maintain the inclination angle of the lower surface of the light guide panel 15.

The concave-convex structure of the bottom surface according to the current embodiment may maintain the shape of the bottom cover 110 and reinforce the bottom cover 110.

In a same manner as the previous embodiment, the lower surface of the light guide panel 15 may be provided with the reflective member 17, and the reflective members 17 may be classified into the extension reflective members 17a and the non-extension reflective members 17b according to installation positions of the optical assemblies 10, that is, according to whether the optical assemblies 10 are arrayed on the center line C or the left and right lines L and R.

However, since the non-extension reflective member 17b according to the current embodiment is substantially the same in configuration as the non-extension reflective member 17b according to the previous embodiment, the extension reflective member 17a according to the current embodiment will now be described principally.

Referring to FIGS. 9 and 11, the non-extension reflective member 17b according to the current embodiment includes the reflective region 171, the extension regions 172 disposed at the left and right sides of the reflective region 171 in the third direction (x-axis direction), and the fixing region 173 disposed at the second side of the reflective region 171.

The rear side of the extension regions 172, that is, portions of the extension regions 172 adjacent to the fixing region 173 are provided with inclination parts 176 where the width w3 of the extension regions 172 decreases to a rear border of the non-extension reflective member 17b.

A start portion of the extension regions 172 where the inclination parts 176 start may be disposed at a position that is disposed along a length d9 of the extension regions 172 in the first direction (y-axis direction) and is adjacent to the rear border of the reflective member 17.

An interference-free distance d10 from the rear border of the reflective member 17 to the start portion where the inclination part 176 starts corresponds to a length of a support 22a (refer to FIG. 12) of the second side cover 22 in the first direction (y-axis direction).

Since a width of the extension regions 172 corresponding to the interference-free distance d10 is smaller than the width w3 of the other portions thereof, the extension regions 172 of the extension reflective member 17a arrayed on the center line C are prevented from interfering with the second side covers 22 of the optical assemblies 10 arrayed on the left and right lines L and R.

In addition, although end portions where the inclination parts 176 end are located at points where the fixing region 173 contacts the reflective region 171 in the current embodiment, the end portions may be located at a point in the fixing region 173 or at the rear border of the reflective member 17.

When the end portions of the inclination parts 176 are located at the points where the fixing region 173 contacts the reflective region 171, the extension regions 172 extend down to the points where the fixing region 173 contacts the reflective region 171.

When the end portions of the inclination parts 176 may be located at a point in the fixing region 173 or at the rear border of the reflective member 17, the extension regions 172 extend down to the point corresponding to the fixing region 173 or the rear border of the reflective member 17.

Alternatively, the extension regions 172 may extend down to points in the fixing region 173, without the inclination parts 176.

Hereinafter, the configuration of the side cover 20 will now be described in detail.

Figure 12:
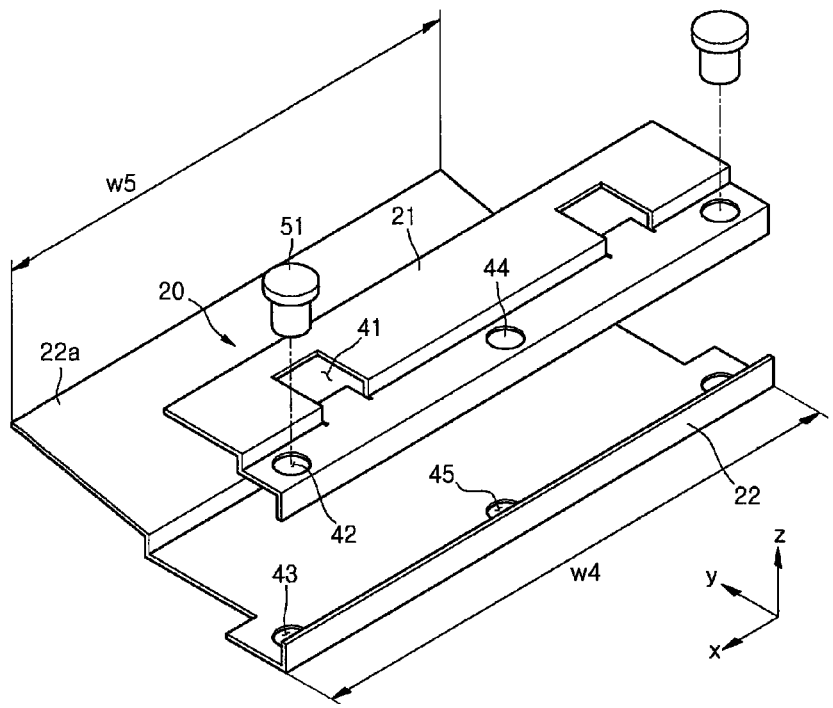
FIG. 12 is a perspective view illustrating upper and lower covers of FIG. 9.

FIG. 12 is a perspective view illustrating the side cover 20 of FIG. 9.

Referring again to FIG. 12, the side cover 20 surrounds the light source 13 and at least one portion of the light guide panel 15.

The side cover 20 may include the first side cover 21 disposed on the light source 13 and the light incident part 15b, and the second side cover 22 disposed under the light incident part 15b. The side cover 20 may be formed of plastic or metal.

In more detail, the first side cover 21 faces the upper surface of the light incident part 15b, and may be bent in the second direction (z-axis direction) at the upper surface of the light incident part 15b to face the light incident surface 16.

The second side cover 22, facing the lower surface of the light incident part 15b, may be bent in the second direction (z-axis direction) at the lower surface of the light incident part 15b to face the light incident surface 16. The support 22a of the second side cover 22 may be inclined from the first direction (y-axis direction) along the lower surface of the light guide panel 15, that is, along an inclined surface of the light guide panel 15. The second side cover 22 may accommodate the light source 13.

The support 22a supports the lower surface of the light guide panel 15 and at least one portion of the reflective member 17 in the second direction (z-axis direction).

The first side cover 21 is coupled to the second side cover 22 through the first fixing member 61 to prevent the shaking of the light source 13 and the light guide panel 15 due to external shock, and particularly, prevent the shaking in the second direction (z-axis direction).

The second side cover 22 supports the inclined surface of the light guide panel 15 to firmly maintain alignment of the light guide panel 15 with the light source 13 and protect the light guide panel 15 and the light source 13 from external shock.

The first side cover 21 may have the first holes 41 at positions corresponding to the protrusions 30 of the light incident part 15b.

The first holes 41 may be larger than the protrusions such that the protrusions 30 are fitted and caught to the first holes 41. In this case, the protrusion 30 disposed in the first hole 41 partially has a predetermined gap that may be a margin for preventing the torsion of the light guide panel 15 when the light guide panel 15 is expanded by environmental change such as sharp temperature increase. In this case, the rest of the protrusion 30 without the predetermined gap may be in contact with the first side cover 21 to increase fixing force thereof.

At least one second hole 42 may be further disposed in the first side cover 21. The second side cover 22 may have at least one third hole 43 at a position corresponding to the second hole 42.

The second and third holes 42 and 43 are disposed on a straight line in the first direction (z-axis direction) such that the first fixing member 61 is inserted to firmly fix the first and second side covers 21 and 22. To secure fixing force for the first and second side covers 21 and 22, the optical assembly 10 may have at least two couples each including the second and third holes 42 and 43. The second and third holes 42 and 43 may be disposed at any position of the first and second side covers 21 and 22, respectively.

Although the second and third holes 42 and 43 are exemplified as through holes according to the current embodiment, the second and third holes 42 and 43 may be configured to receive at least one portion of a fixing member for fixing the first and second side covers 21 and 22. Thus, the second and third holes 42 and 43 may be referred to as first and second insertion parts such as holes or recesses.

The first and second side covers 21 and 22 may be referred to as upper and lower covers.

The second hole 42 and the first hole 41 may be disposed in the first side cover 21 on a straight line in the first direction (y-axis direction). In this case, the coupling force between the light guide panel 15 and the first side cover 21 through the first hole 41 and the protrusion 30 of the light guide panel 15, and the coupling force between the first and second side covers 21 and 22 through the second and third holes and 43 and the first fixing member 61 improve fixing efficiency of the first and second side covers 21 and 22.

The positions of the first through third holes 41, 42, and 43, and the protrusions 30 are limited thereto, provided that coupling force is applied between the light guide panel 15 and the side cover 20. That is, holes such as the second and third holes 42 and 43 may be respectively disposed in the side surfaces where the first and second side covers 21 and 22 overlap such that a fixing member is inserted into the holes in the first direction (y-axis direction).

The first and second side covers 21 and 22 may be respectively provided with a fourth hole 44 and a fifth hole 45 through which a second fixing member 52 fixing the optical assembly 10 to the bottom cover 110 passes.

Substantially, the rest of the optical assembly 10 except for the light emitting part 15a of the light guide panel 15 is a first area that does not provide light to the display panel 210. The width of the first area may be decreased according to the arrangement of the first through third holes 41, 42, and 43.

For example, the width of the first area A in the case where the second and third holes 42 and 43 are disposed between the LEDs 11 may be less than the width of the first area A in the case where the second and third holes 42 and 43 are disposed behind the LEDs 11.

The shapes of the first through third holes 41, 42, and 43 disposed in the side cover 20 of the optical assembly 10 are varied within the scope of the present disclosure.

The first fixing member 61 may be a screw or a fixing pin, but is not limited thereto.

When the first fixing member 61 is a screw, threads are provided to the inner surfaces of the second and third holes 42 and 43. Thus, the first fixing member 61 is screwed into the second and third holes 42 and 43 to tighten and fix the light guide panel 15 and the light source 13 interposed therebetween.

To secure the pitch of threads provided to the second and third holes 42 and 43, the thicknesses of portions of the first and side covers 21 and 22 around the second and third holes 42 and 43 may be greater than the thicknesses of the rest of the first and side covers 21 and 22, or a discrete member may be provided around the second and third holes 42 and 43.

The third holes 43 and the fifth hole 45 are disposed at a first side of the second side cover 22, and the support 22a is disposed at a second side thereof.

The second side cover 22 extending in the third direction (x-axis direction) has a first width w4 at the first side and a second width w5 at the second side.

The first width w4 is greater than the second width w5. The first width w4 may be equal to the first width w1 of the light guide panel 15 in the third direction (x-axis direction) and the width w2 of the reflective region 171 in the third direction (x-axis direction).

That is, when the optical assemblies 10 according to the current embodiment are arranged in the backlight unit 100, a distance between the second side cover 22 of one of the optical assemblies 10 and the second side cover 22 of another one adjacent to the optical assembly 10 is smallest at the first side of the second side cover 22 having the first width w4, and is largest at the second side of the second side cover 22 having the second width w5.

In the current embodiment, the second side cover 22 gradually decreases in width from the first side to the second side thereof.

That is, when the extension region 172 of the extension reflective member 17a disposed on the center line C has a portion corresponding to the interference-free distance d10 within the width w3, the portion corresponding to the interference-free distance d10 decreases in width in a direction, for example, in a −y-axis direction, and thus, the second side cover 22 decreases in width in another direction, for example, in a +y-axis direction to correspond to the portion of the extension region 172. Thus, the extension regions 172 of one of the optical assemblies 10 can be prevented from contacting or interfering with the second side cover 22 of another one adjacent to the optical assembly 10.

Alternatively, instead of the gradual width decrease of the second side cover 22 to the second side, the second side cover 22 may decrease in width in a stepwise fashion.

According to the current embodiment, since the light sources 13, the substrate 14, and the light guide panel 15 are integrally coupled using the second side cover 22 to constitute the optical assembly 10, the backlight unit 100 can be simply fabricated just by disposing the optical assembly 10 in the backlight unit 100, instead of separately assembling the optical assembly 10.

FIGS. 13 to 16 are schematic views illustrating extension reflective members installed on a light guide panel and a substrate according to embodiments.

Since optical assemblies according to the current embodiments are the same in configuration as that of the first embodiment of FIGS. 1 to 7 except for the extension reflective members, characterized parts of the current embodiments will now be principally described.

Figure 13:
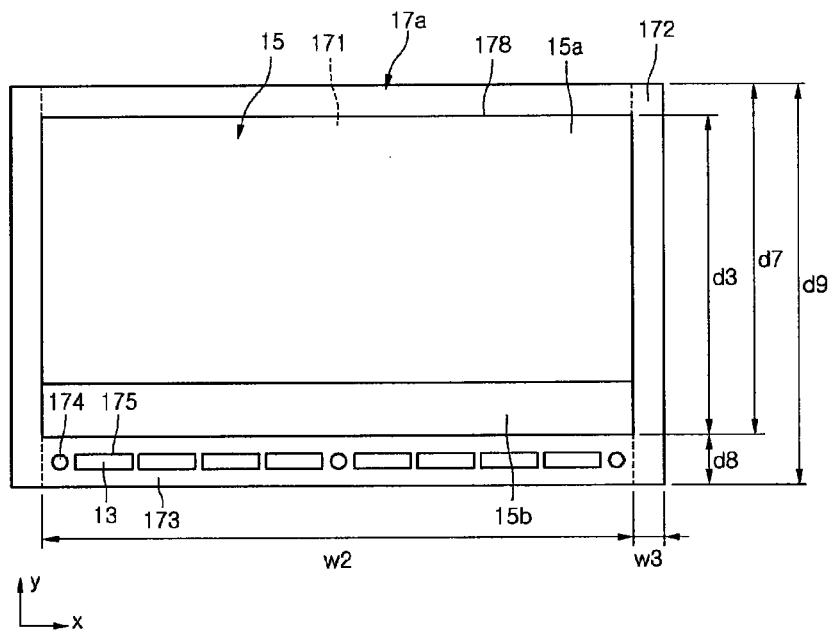
FIG. 13 is a plan view illustrating an extension reflective member installed on a light guide panel and a substrate according to an embodiment.

Referring to FIG. 13, the length d7 in the first direction (y-axis direction) of the extension reflective member 17a according to an embodiment is greater than the length d3 of the lower surface of the light guide panel 15 in the first direction.

Thus, unlike the extension reflective member 17a according to the first embodiment, a second extension region 178 is formed at the second side of the reflective region 171, that is, at the opposite side to the first side where the fixing region 173 contacts the reflective region 171. In this case, the extension regions 172 of the extension reflective member 17a according to the first embodiment may be referred to as first extension regions.

The second extension region 178 does not overlap the light guide panel 15, like the extension regions 172. However, while the extension regions 172 are disposed within the second distance d4 when the optical assemblies 10 are provided to the backlight unit 100, the second extension region 178 is disposed within the first distance d6 crossing the second distance d4.

A length of the second extension region 178 in the first direction (y-axis direction) is the difference between the length d7 of both the reflective region 171 and the second extension region 178 in the first direction (y-axis direction) and the length d3 of the light guide panel 15 in the first direction.

That is, the first extension regions 172 extend in the third direction (x-axis direction) from the borders of the light guide panel 15 crossing the third direction, and the second extension region 178 extends in the first direction (y-axis direction) from the border of the light guide panel 15 crossing the first direction.

The second extension region 178 overlaps at least one portion of the light guide panel 15 of an adjacent one of the optical assemblies 10, and is disposed above the light guide panel 15 of the adjacent optical assembly 10, and thus, is exposed in the first direction (y-axis direction).

In a same manner as the first embodiment, a region overlapping the light guide panel 15 may be referred to as the first region, and the first extension regions 172 and the second extension region 178 may be referred to as the second regions that do not overlap the light guide panel 1.

Figure 14:
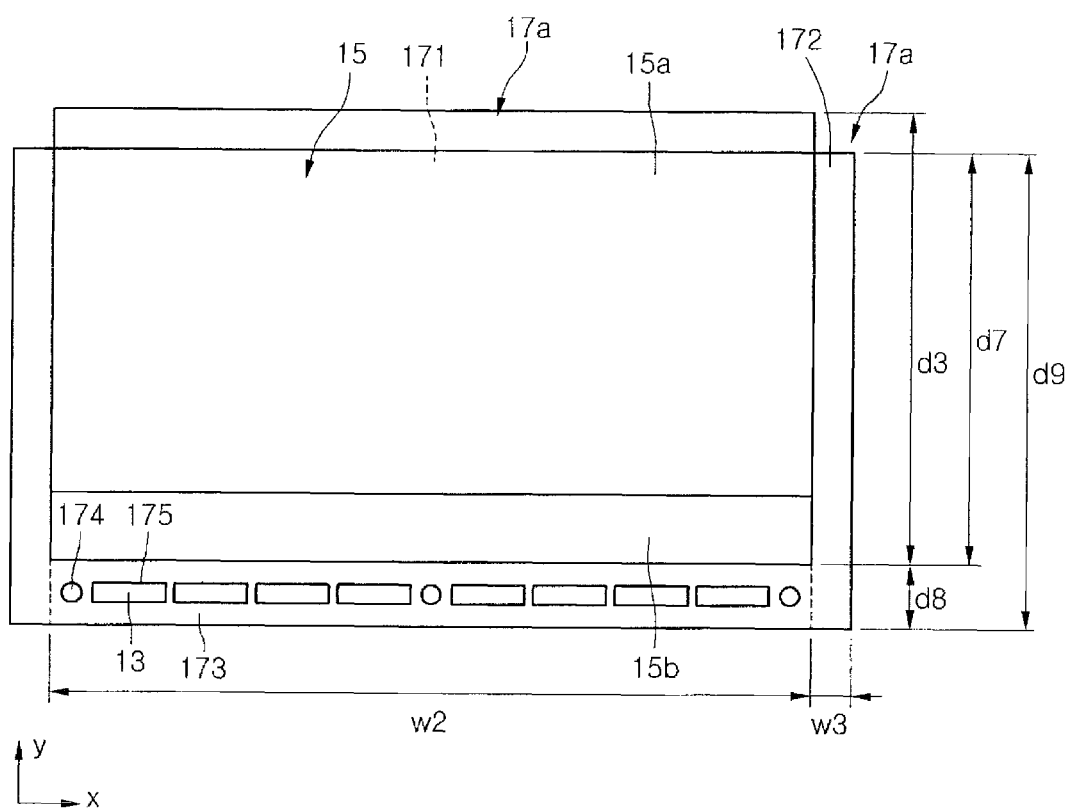
FIG. 14 is a plan view illustrating an extension reflective member installed on a light guide panel and a substrate according to another embodiment.

Referring to FIG. 14, according to an embodiment, a length of the rest of the extension reflective member 17a except for the fixing region 173 in the first direction (y-axis direction) is smaller than the length of the light guide panel 15 in the first direction.

Thus, a portion of the lower surface of the light guide panel 15 overlaps the reflective region 171, and the rest thereof does not overlap the reflective region 171.

Figure 15:
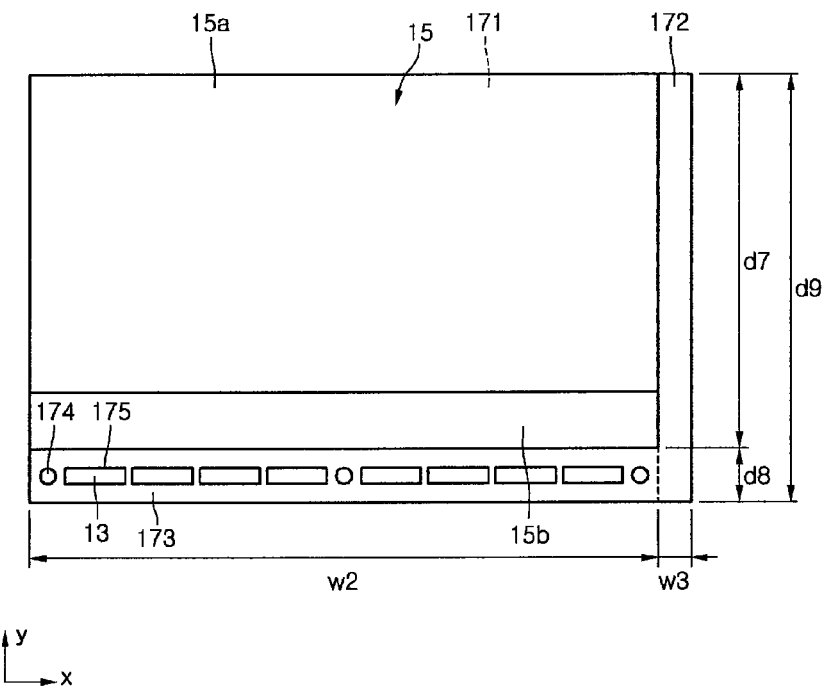
FIG. 15 is a plan view illustrating an extension reflective member installed on a light guide panel and a substrate according to another embodiment.

Referring to FIG. 15, according to an embodiment, only one of the left and right sides of the reflective region 171 is provided with the extension region 172, unlike the extension reflective member 17a including the extension regions 172 at the left and right sides of the reflective region 171 according to the first embodiment.

In more detail, the extension region 172 according to the current embodiment extends through the second distance d4 from one of the left and right borders of the reflective region 171 adjacent to the space defined by the second distance d4.

When the optical assemblies 10 are provided to the backlight unit 100, at least one portion of the extension reflective member 17a may overlap at least one portion of the adjacent extension reflective member 17a without the non-extension reflective member 17b, unlike the first embodiment.

Figure 16:
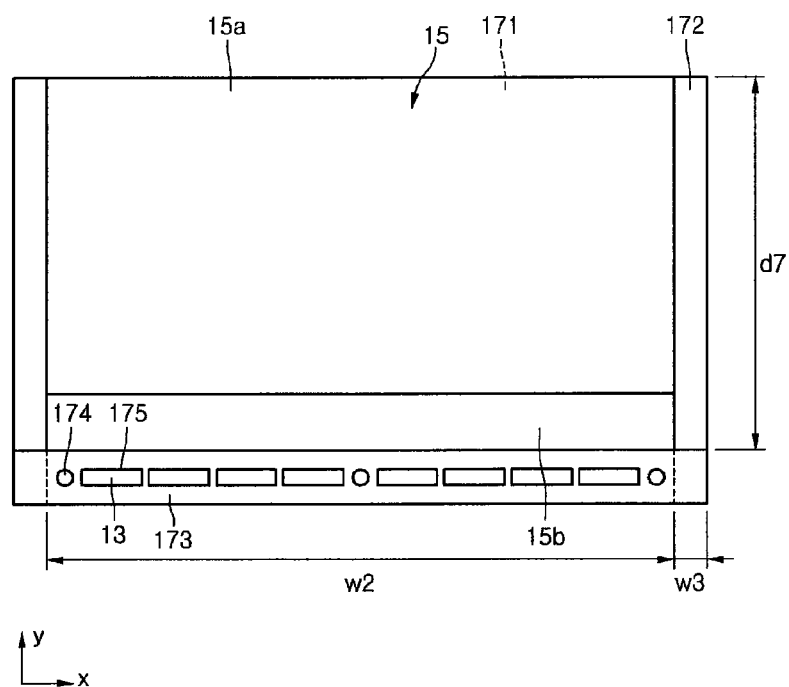
FIG. 16 is a plan view illustrating an extension reflective member installed on a light guide panel and a substrate according to another embodiment.

Referring to FIG. 16, according to an embodiment, the fixing region 173 is omitted from the extension reflective member 17a, unlike the first embodiment in which the extension reflective member 17a includes the fixing region 173 to fix the relative position to the light sources 13 and the substrate 14.

Thus, according to the current embodiment of FIG. 16, at least one portion of the lower surface of the extension reflective member 17a is placed on at least one of the substrate 14, the bottom cover 110, and the second side cover 22, and at least one portion of the upper surface is pressed downward by the lower surface of the light guide panel 15, thereby supporting the extension reflective member 17a.

FIGS. 17 to 22 are cross-sectional views illustrating backlight units according to embodiments. FIGS. 17 to 22 correspond to FIG. 8 taken along line B-B of FIG. 3 according to the first embodiment.

In the current embodiments, since other configurations except for configurations and types of the reflective member 17 disposed on the lower surface of the light guide panel 15 are substantially the same as that of the first embodiment, characterized parts of the current embodiments will be principally described.

Figure 17:
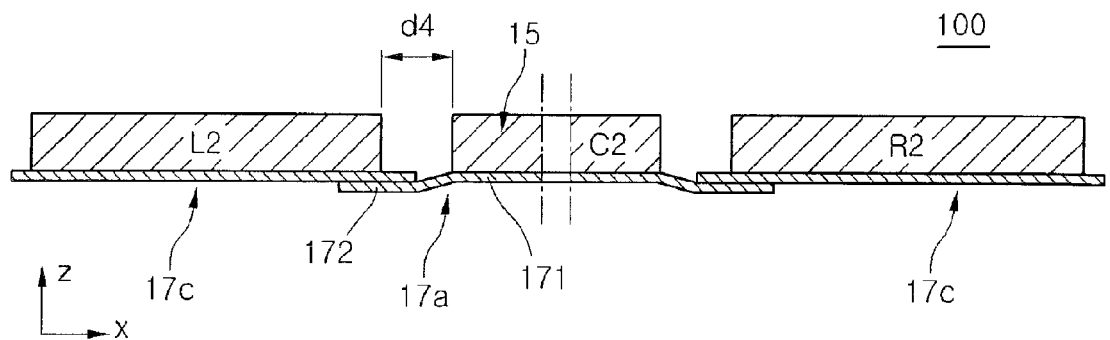
FIG. 17 is a cross-sectional view illustrating a backlight unit according to an embodiment.

Referring to FIG. 17, in the backlight unit 100 according to an embodiment, the extension reflective member 17a is disposed on the lower surface of the light guide panel 15 corresponding to C2 on the center line C, and second extension reflective members 17c are disposed on the lower surfaces of the light guide panels 15 corresponding to L2 and R2 on the left and right lines L and R.

In more detail, the width w3 of the extension regions 172 of the extension reflective member 17a in the third direction is greater than the second distance d4, and the extension regions 172 are provided in a pair at the left and right sides of the reflective region 171, like the extension reflective member 17a of the first embodiment.

The second extension reflective members 17c include the extension regions 172, like the first extension reflective member 17a. In this case, the width w3 of the extension regions 172 of the second extension reflective members 17c in the third direction (x-axis direction) is smaller than the second distance d4, unlike the width w3 of the extension regions 172 of the first extension reflective members 17a in the third direction (x-axis direction).

The extension regions 172 of the second extension reflective members 17c are provided in a pair at the left and right sides of the reflective region 171 in the third direction (x-axis direction), like the first extension reflective member 17a.

Thus, the extension regions 172 of the first extension reflective member 17a according to the current embodiment at least partially overlap the extension regions 172 of the second extension reflective members 17c within the second distance d4.

Figure 18:
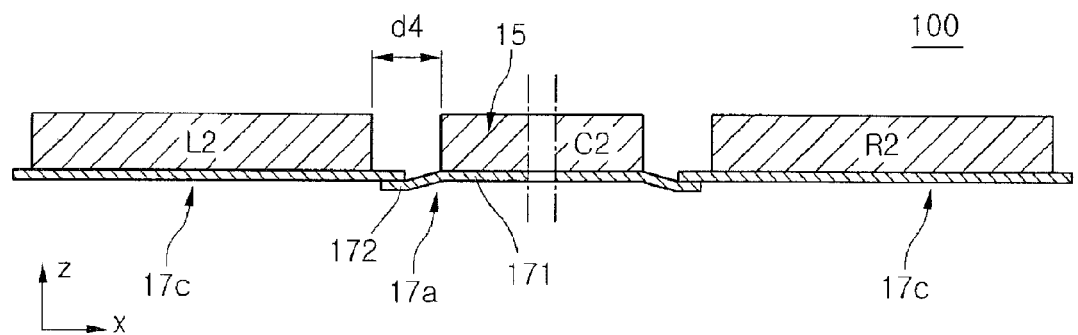
FIG. 18 is a cross-sectional view illustrating a backlight unit according to another embodiment.

Referring to FIG. 18, in the backlight unit 100 according to an embodiment, at least one portion of the first extension reflective member 17a disposed on the center line C, that is, the extension region 172 thereof overlaps, within the second distance d4, at least one portion of the second extension reflective member 17c disposed on the left and right lines L and R, that is, the extension region 172 thereof.

In this case, the width w3 of the extension region 172 of the extension reflective member 17a in the third direction (x-axis direction) is smaller than the second distance d4, unlike the embodiment of FIG. 17.

Thus, the extension region 172 of the first extension reflective member 17a overlaps the extension region 172 of the second extension reflective members 17c only within the second distance d4.

Since the other configurations of the current embodiment are the same as those of the embodiment of FIG. 17, a description thereof will be omitted.

Figure 19:
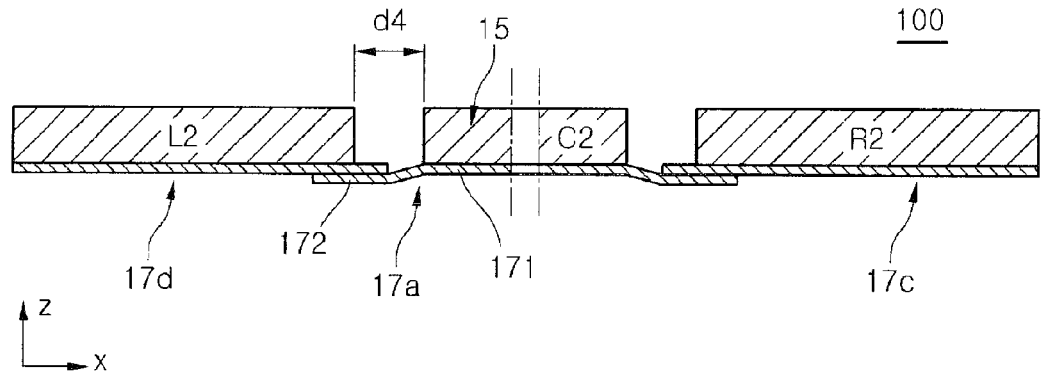
FIG. 19 is a cross-sectional view illustrating a backlight unit according to another embodiment.

Referring to FIG. 19, the backlight unit 100 according to an embodiment includes third extension reflective members 17d, each of which includes only one of the extension regions 172 on each of the lower surfaces of the light guide panels 15 disposed on the left and right lines L and R.

That is, in the backlight unit 100 according to the current embodiment, a border that is selected from the left and right borders of the third extension reflective member 17d in the third direction (x-axis direction) and is adjacent to the space defined by the second distance d4 is provided with the extension region 172, and the other is not provided with the extension region 172.

Thus, the extension region 172 of the third extension reflective member 17d corresponding to L2 on the left line L is disposed at the right border of the third extension reflective member 17d adjacent to the space defined by the second distance d4, and the extension region 172 of the third extension reflective member 17d corresponding to R2 on the left line R is disposed at the left border of the third extension reflective member 17d.

Since the configurations of the backlight unit 100 except for the third extension reflective member 17d are the same as those of the embodiment of FIG. 17, a description thereof will be omitted.

Figure 20:
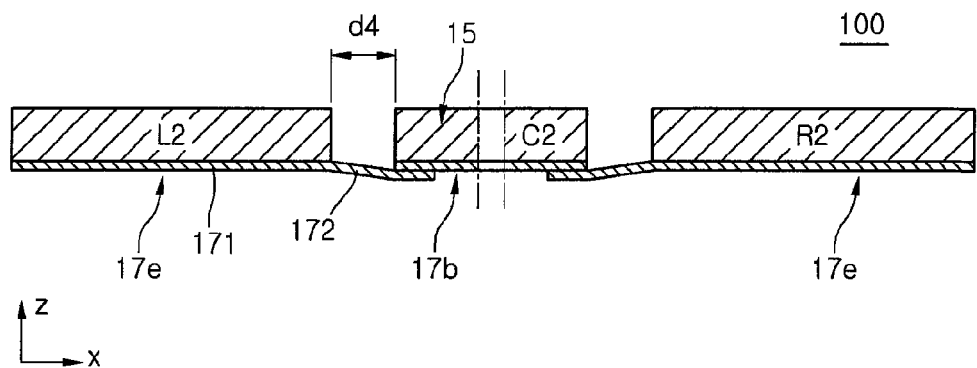
FIG. 20 is a cross-sectional view illustrating a backlight unit according to another embodiment.

Referring to FIG. 20, the backlight unit 100 according to an embodiment includes the non-extension reflective member 17b disposed on the lower surface of the light guide panel 15 corresponding to C2 on the center line C, and fourth extension reflective members 17e disposed on the lower surfaces of the light guide panels 15 disposed on the left and right lines L and R.

In more detail, the width w3 of the extension regions 172 of the fourth extension reflective members 17e in the third direction (x-axis direction) is greater than the second distance d4. A border that is selected from the left and right borders of the fourth extension reflective members 17e in the third direction (x-axis direction) and is adjacent to the space defined by the second distance d4 is provided with the extension region 172, and the other is not provided with the extension region 172.

Thus, the extension region 172 of the fourth extension reflective member 17e corresponding to L2 on the left line L is disposed at the right border of the fourth extension reflective member 17e adjacent to the space defined by the second distance d4, and the extension region 172 of the fourth extension reflective member 17e corresponding to R2 on the left line R is disposed at the left border of the fourth extension reflective member 17e.

At least one portion of the extension region 172 of the fourth extension reflective member 17e overlaps the non-extension reflective member 17b on the center line C.

Figure 21:
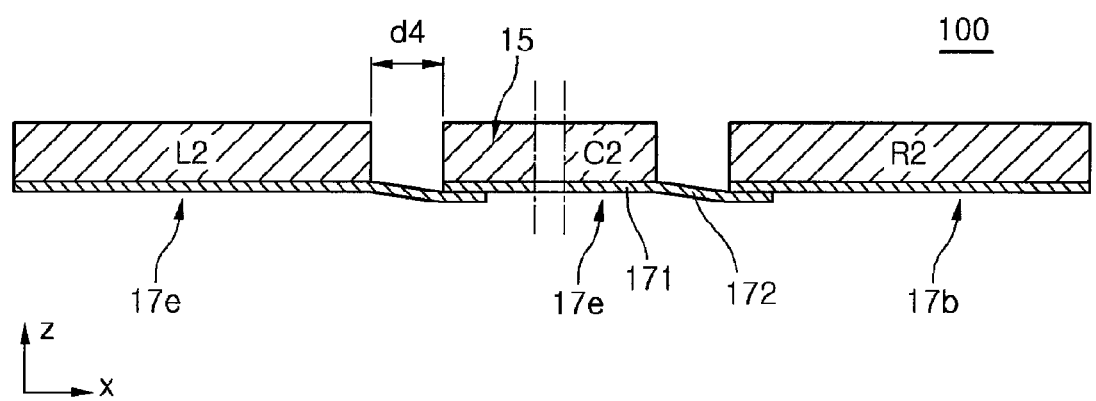
FIG. 21 is a cross-sectional view illustrating a backlight unit according to another embodiment.

Referring to FIG. 21, the backlight unit 100 according to an embodiment includes the fourth extension reflective members 17e disposed on the left line L and the center line C, and the non-extension reflective member 17b disposed on the right line R.

Thus, the extension region 172 of the fourth extension reflective member 17e disposed on the left line L overlaps at least one portion of the reflective region 171 of the fourth extension reflective members 17e on the center line C adjacent to the left line L.

The extension region 172 of the fourth extension reflective member 17e disposed on the center line C overlaps at least one portion of the reflective region 171 of the non-extension reflective member 17b disposed on the right line R.

Since the configurations of the backlight unit 100 according to the current embodiment are the same as those of the embodiment of FIG. 19 except that the fourth extension reflective members 17e are disposed on the left line L and the center line C and the non-extension reflective member 17b are disposed on the right line R, a description thereof will be omitted.

Figure 22:
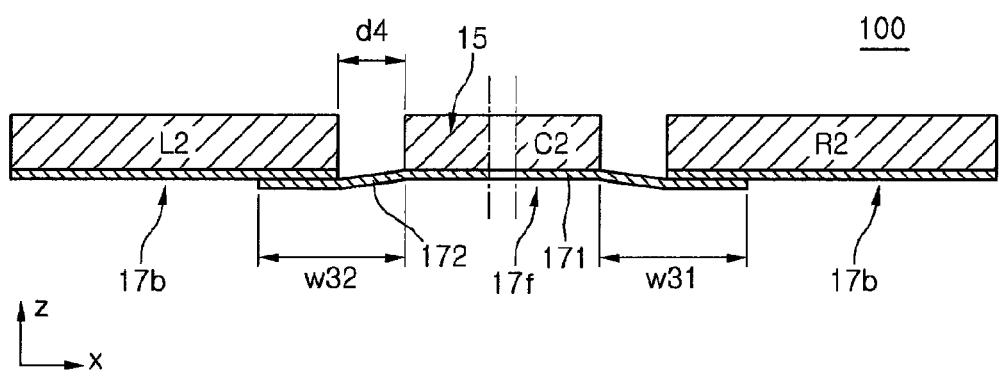
FIG. 22 is a cross-sectional view illustrating a backlight unit according to another embodiment.

Referring to FIG. 22, the backlight unit 100 according to an embodiment includes a fifth extension reflective member 17f on the center line C. The extension regions 172 of the fifth extension reflective member 17f disposed on the left and right borders of the reflective region 171 have a width w32 and a width w31 that are different from each other in the third direction (x-axis direction).

The width w31 and width w32 of the extension regions 172 are greater than the second distance d4.

The non-extension reflective members 17b are disposed on the left and right lines L and R, and at least one portion of the reflective region 171 of the non-extension reflective member 17b overlaps at least one portion of the extension region 172 of the fifth extension reflective member 17f.

FIGS. 23 to 26 are cross-sectional views illustrating backlight units according to embodiments.

In the current embodiments, the light guide panels 15 are arrayed on left, right, first center, and second center lines L, R, C1, and C2, unlike the first embodiment in which the light guide panels 15 are arrayed on the left, right, and center lines L, R, and C. Hereinafter, characterized parts of the current embodiments will be principally described.

Figure 23:
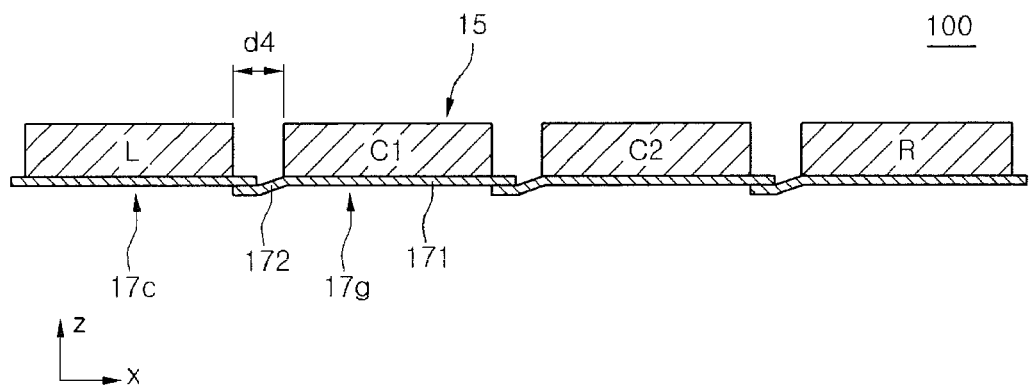
FIG. 23 is a cross-sectional view illustrating a backlight unit according to another embodiment.

Referring to FIG. 23, in the backlight unit 100 according to an embodiment, the second extension reflective member 17c is disposed only on the lower surface of the light guide panel 15 on the left line L, and sixth extension reflective members 17g are disposed on the lower surfaces of the light guide panels 15 on the right, first center, and second center lines R, C1, and C2.

In more detail, as described above, the second extension reflective member 17c includes the extension regions 172 having the width smaller than the second distance d4, and is disposed on the lower surface of the light guide panel 15 corresponding to L2 on the left line L.

The sixth extension reflective members 17g include the extension regions 172, and are disposed on the right, first center, and second center lines R, C1, and C2. In this case, the extension regions 172 of the sixth extension reflective member 17g have different widths, the width of one of the extension regions 172 is greater than the second distance d4, and the width of the other of the extension regions 172 is smaller than the second distance d4.

At least one portion of the extension region 172 of the sixth extension reflective member 17g, which is adjacent to C11 on the first center line C1 and has the width greater than the second distance d4, overlaps at least one portion of the second extension reflective member 17c provided to L2 on the left line L.

The sixth extension reflective member 17g corresponding to C11 on the first center line C1, the sixth extension reflective member 17g corresponding to C12 on the second center line C2, and the sixth extension reflective member 17g corresponding to R2 on the right line R overlap one another to prevent a portion of the bottom cover 110 from being exposed in the second direction (z-axis direction) through the second distance d4.

Figure 24:
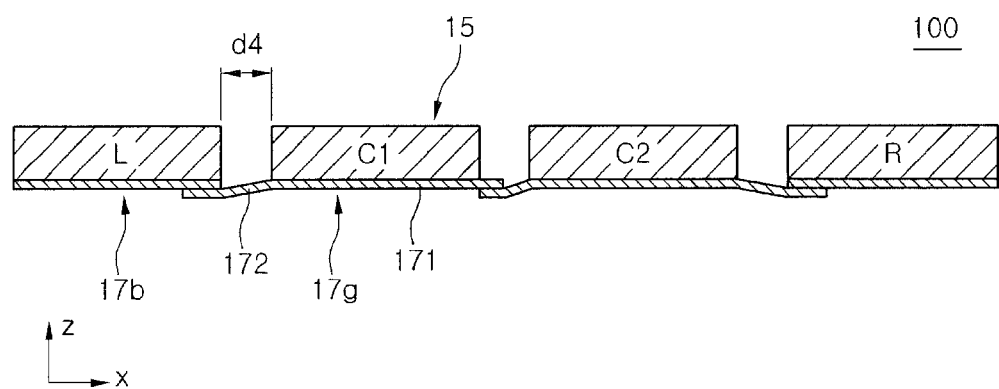
FIG. 24 is a cross-sectional view illustrating a backlight unit according to another embodiment.

Referring to FIG. 24, the backlight unit 100 according to an embodiment includes the non-extension reflective members 17b disposed respectively on the left and right lines L and R, and the sixth extension reflective members 17g disposed respectively on the first and second center lines C1 and C2.

Figure 25:
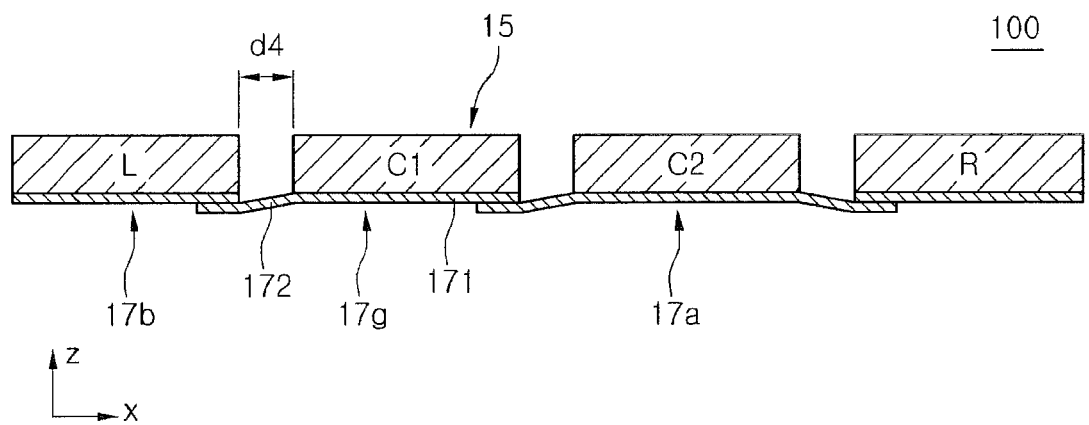
FIG. 25 is a cross-sectional view illustrating a backlight unit according to another embodiment.

Referring to FIG. 25, the backlight unit 100 according to an embodiment includes the non-extension reflective members 17b disposed respectively on the left and right lines L and R, the fourth extension reflective member 17e disposed on the first center line C1 and including the extension region 172 and overlapping at least one portion of the non-extension reflective member 17b on the left ling L, and the extension reflective member 17a disposed on the second center line C2 and including the extension regions 172 overlapping respectively both of at least one portion of the non-extension reflective member 17b on the right ling R and at least one portion of the fourth extension reflective member 17e.

Figure 26:
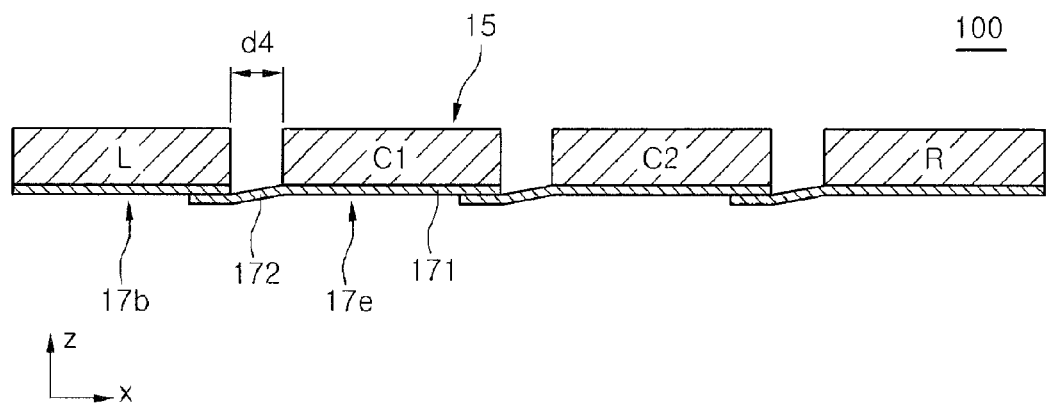
FIG. 26 is a cross-sectional view illustrating a backlight unit according to another embodiment.

Referring to FIG. 26, the backlight unit 100 according to an embodiment includes the non-extension reflective member 17b disposed on the left line L, and the fourth extension reflective members 17e disposed on the first and second center lines C1 and C2 and the right line R and including the extension regions 172 overlapping at least one portion of adjacent another reflective member.

While the light source 13 emits light, intense heat is generated from the light source 13. When the intense heat is transferred directly to the light guide panel 15, the light guide panel 15 may be thermally damaged or deformed. Thus, optical efficiency is degraded, or a structural deformation occurs, which may degrade the reliability of the display apparatus 1.

Thus, a space d12 is disposed between the light source 13 and the light incident surface 151 of the light guide panel 15 to prevent thermal damage or thermal deformation due to a contact.

Hereinafter, a configuration that the light incident surface 151 is spaced apart from the light source 13 will now be described in detail.

Figure 27:
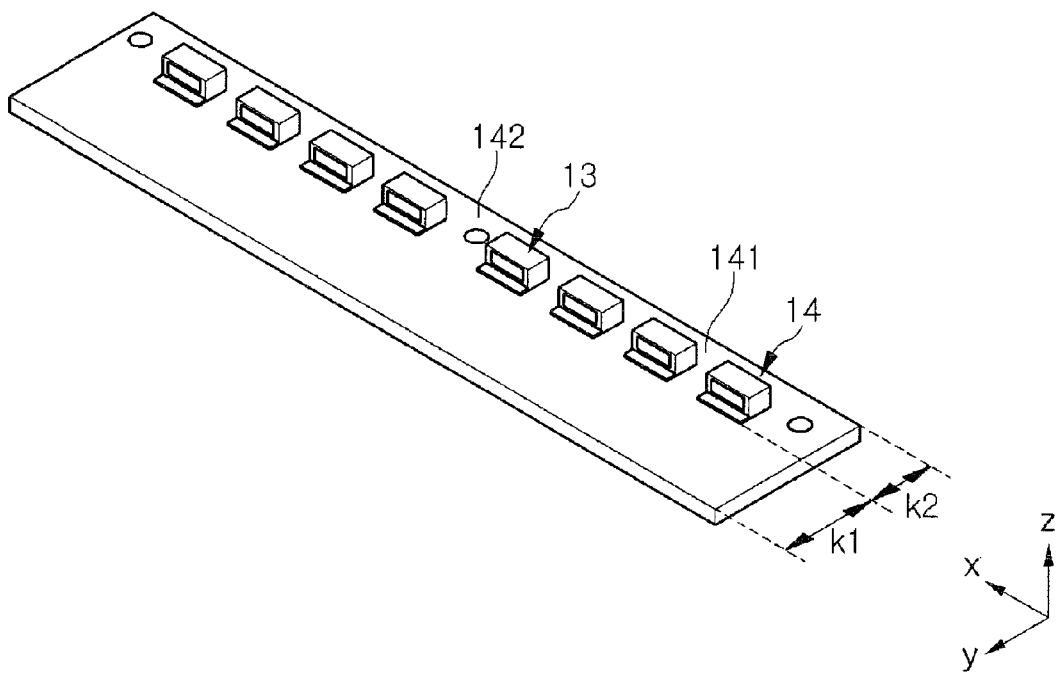
FIG. 27 is a schematic view illustrating the light sources and the substrate according to the embodiment of FIG. 1.
Figure 28:
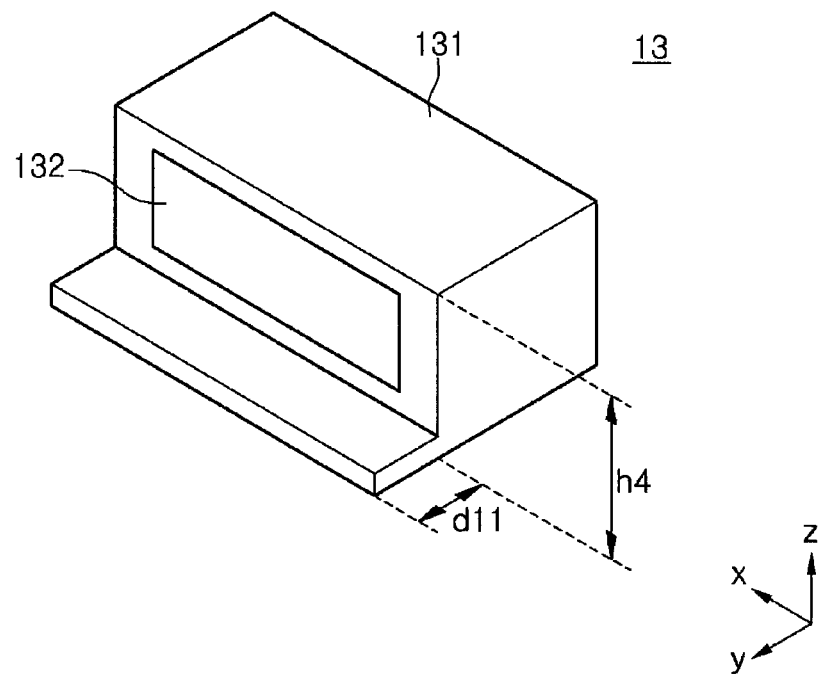
FIG. 28 is a schematic view illustrating the light source according to the embodiment of FIG. 1.
Figure 29:
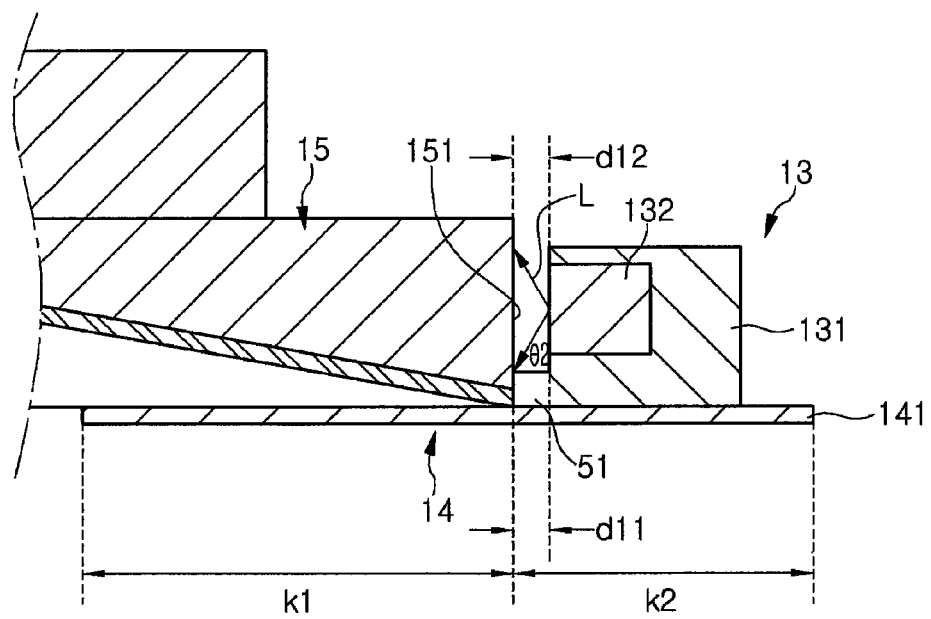
FIG. 29 is an enlarged view illustrating a region B of FIG. 2.

FIG. 27 is a schematic view illustrating the light sources 13 and the substrate 14 according to the first embodiment. FIG. 28 is a schematic view illustrating the light source 13 according to the first embodiment. FIG. 29 is an enlarged view illustrating a region B of FIG. 2.

Referring to FIGS. 27 to 29, the substrate 14 extends in the third direction (x-axis direction).

The light source 13 is provided in plurality. The light sources 13 are spaced a predetermined distance from each other in the third direction (x-axis direction), and are mounted on the substrate 14.

As described above, the substrate 14 includes the front area k1 and the rear area k2, and the width of the front area k1 in the first direction (y-axis direction) is greater than that of the rear area k2 in the first direction (y-axis direction).

That is, when at lest one portion of the light guide panel 15 is placed on the substrate 14, the light incident surface 151 of the light guide panel 15 is disposed at the front area k1 having the width greater than that of the rear area k2.

The light source 13 includes a housing 131 forming the appearance thereof, and a light emitting surface 132 for emitting light at a predetermined orientation angle θ2 from the first direction (y-axis direction).

The housing 131 packages an inner part such as an inner light emitting electronic device, and be formed, e.g., of metal or synthetic resin.

The light emitting surface 132 is disposed at a side of the housing 131, and extends in the first direction (y-axis direction) to face the light incident surface 151 of the light guide panel 15. The light emitting surface 132 may be provided with a material such as a phosphor to convert a predetermined wavelength of emitted light to another wavelength.

When the light guide panel 15 is placed on the substrate 14, a spacing member 51 is disposed at the lower side of the light emitting surface 132, that is, under a side of the housing 131. The spacing member 51 is disposed in the space d12 between the light incident surface 151 of the light guide panel 15 and the light emitting surface 132 of the light source 13.

In more detail, the spacing member 51 is integrally formed with the housing 131 and protrudes a distance d11 from a side of the housing 131 in the first direction (y-axis direction).

Thus, since the spacing member 51 protrudes the distance d11 from the light source 13, the space d12 between the light emitting surface 132 and the light incident surface 151 may be equal to or greater than the distance d11 of the spacing member 51.

That is, when a side of the spacing member 51 contacts a lower portion of the light incident surface 151 of the light guide panel 15, the space d12 between the light emitting surface 132 and the light incident surface 151 is equal to the distance d11, and when a side of the spacing member 51 does not contact a portion of the light incident surface 151 of the light guide panel 15, the space d12 between the light emitting surface 132 and the light incident surface 151 is greater than the distance d11.

A height of the spacing member 51 in the second direction (z-axis direction) is greater than the thickness of the reflective member 17.

Although the spacing member 51 is disposed at the lower portion of a side of the housing 131 and protrudes to the light guide panel 15 in the current embodiment, the spacing member 51 may be disposed, for example, at the upper or lateral portion of a side of the housing 131 provided that light incident to the light incident surface 151 from the light emitting surface 132 is not interfered.

According to the embodiment, since the module-type backlight unit including the light guide panels is used to provide light to the display panel, the display apparatus is slimmed, and the local driving method such as the local dimming method and the impulsive method is used to improve the contrast ratio of a display image.

In addition, thermal damage or thermal deformation of the light guide panel due to a direct contact between the light guide panel and the light source is prevented to improve the reliability of the display apparatus.

Figure 30:
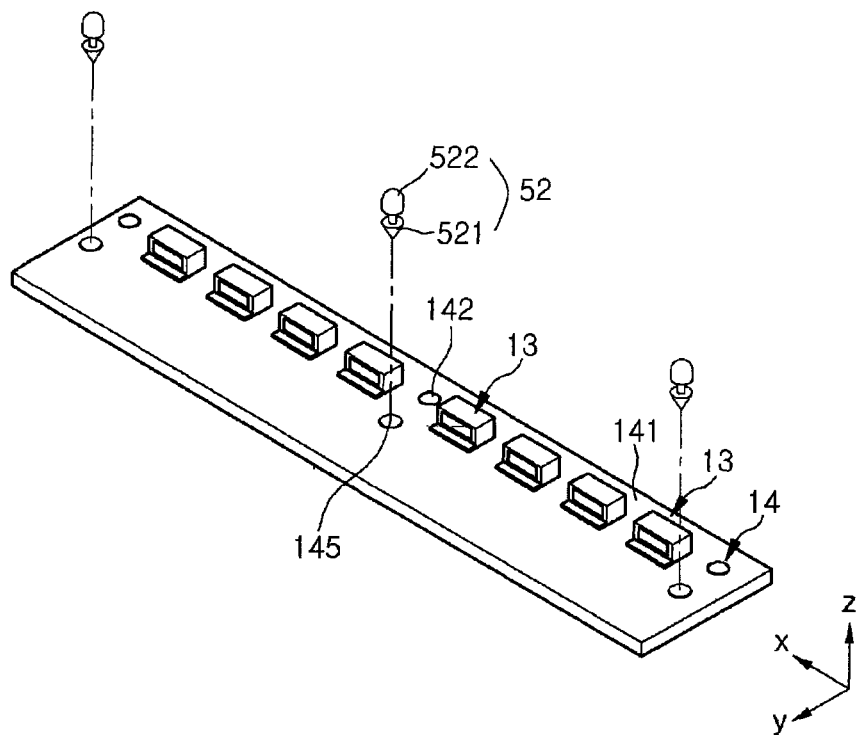
FIG. 30 is a schematic view illustrating light sources and a substrate according to the embodiment of FIG. 9.

FIG. 30 is a schematic view illustrating the light sources 13 and the substrate 14 according to the second embodiment.

Figure 31:
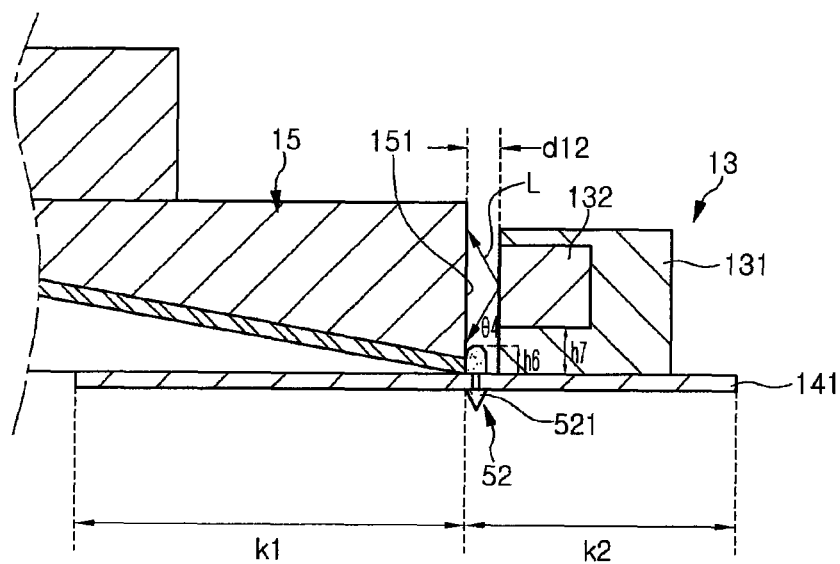
FIG. 31 is an enlarged view illustrating the portion B of FIG. 2 according to the embodiment of FIG. 9.

FIG. 31 is an enlarged view illustrating the portion B of FIG. 2 according to the second embodiment.

In the current embodiment, since other configurations except for a spacing member are substantially the same as those of the first embodiment, characterized parts of the current embodiment will be principally described.

Referring to FIGS. 30 and 31, a spacing member 52 according to the current embodiment is separately formed from the light source 13 and is fixed to the substrate 14, unlike the spacing member 51 of the first embodiment.

In more detail, the spacing member 52 is provided in plurality to be fixed to holes 145 of the substrate 14 spaced a predetermined distance in the first direction (y-axis direction) from the light sources 13 arrayed in the third direction (x-axis direction).

Although the number of the spacing members 52 disposed at both ends of the substrate 14 and the center thereof are three in the current embodiment, the spacing members 52 may be disposed only at both the ends of the substrate 14, or the spacing member 52 may be disposed only at the center thereof.

Alternatively, the number of the spacing members 52 may be greater than three.

The spacing member 52 includes a spacing member fixation part 521 that passes through the hole 145 of the substrate 14 to fix the spacing member 52 to the substrate 14, and a spacing member head part 522 provided to a side of the spacing member fixation part 521 and disposed between the light source 13 and the light incident surface 151 of the light guide panel 15.

For example, the spacing member fixation part 521 may have a latch or hook shape. The spacing member fixation part 521 passes through the substrate 14 from a surface of the substrate 14, that is, from the surface provided with the light sources 13 to another surface thereof such that the spacing member fixation part 521 is fixed to the substrate 14.

The spacing member head part 522 is disposed on the upper surface of the substrate 14. A height h6 of the spacing member head part 522 in the second direction (z-axis direction) is smaller than a height h7 from the upper surface of the substrate 14 to the light emitting surface 132 of the light source 13 to prevent the spacing member head part 522 from blocking light from the light emitting surface 132 to the light guide panel 15.

In a same manner as the first embodiment, at least one portion of the spacing member 52, that is, the spacing member head part 522 is disposed between the light source 13 and the light incident surface 151 of the light guide panel 15 to secure the space d12.

Figure 32:
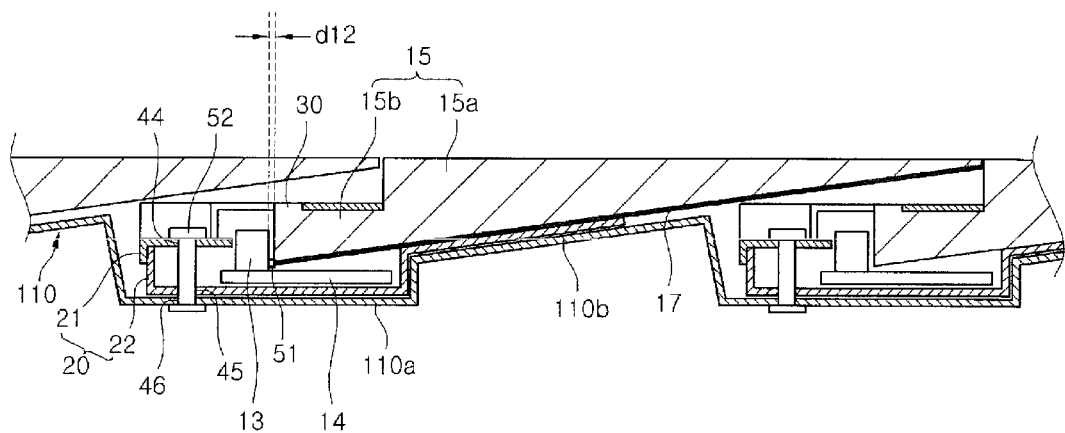
FIG. 32 is a cross-sectional view illustrating a backlight unit according to another embodiment.

FIG. 32 is a cross-sectional view illustrating a backlight unit according to an embodiment.

Referring to FIG. 32, the spacing member 51 is disposed between the light guide panel 15 and the light source 13 to prevent a direct contact between the light guide panel 15 and the light source 13.

Figure 33:
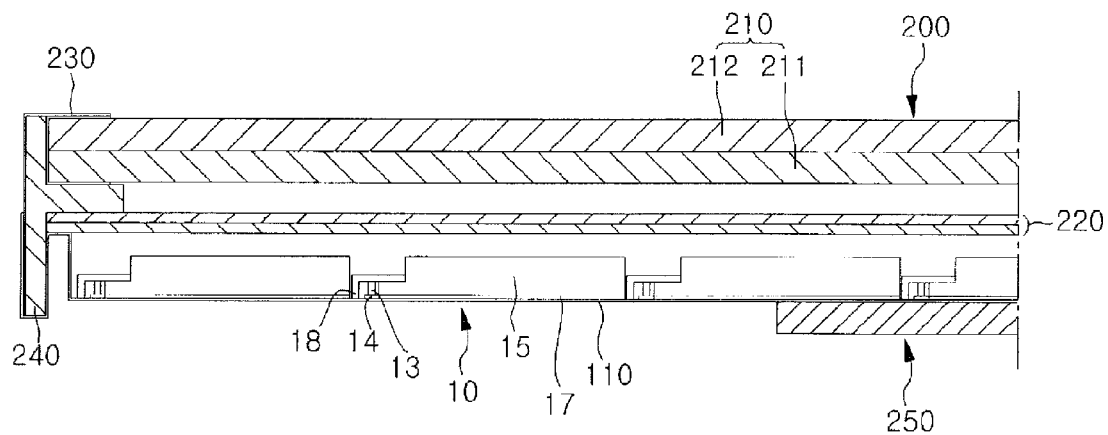
FIG. 33 is a cross-sectional view illustrating a display module according to the embodiment of FIG. 9.
Figure 34:
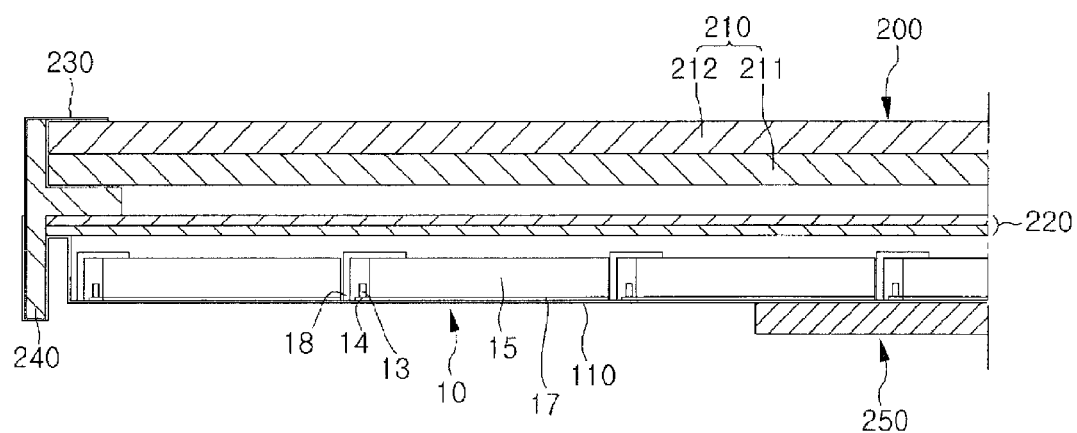
FIG. 34 is a cross-sectional view illustrating a display module according to the embodiment of FIG. 13.
Figure 35:
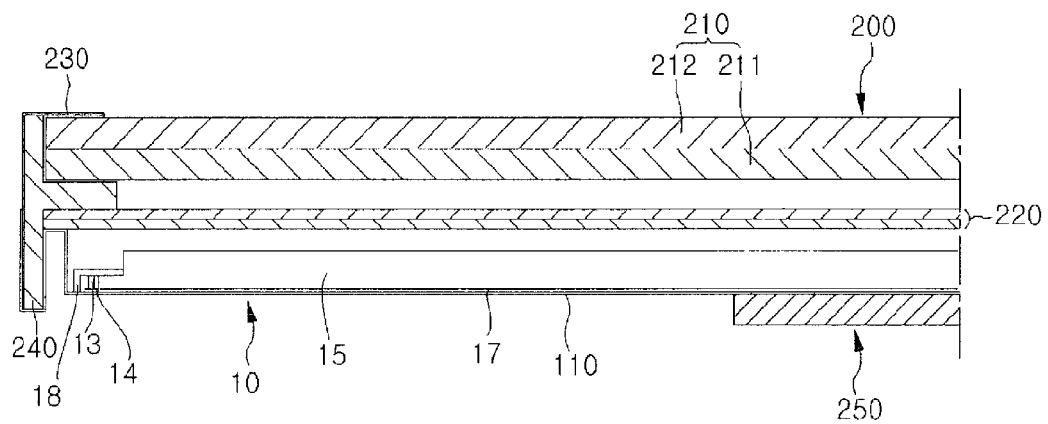
FIG. 35 is a cross-sectional view illustrating a display module according to the embodiment of FIG. 14.

FIG. 33 is a cross-sectional view illustrating the display module 200 according to the second embodiment. FIG. 34 is a cross-sectional view illustrating the display module 200 according to the third embodiment. FIG. 35 is a cross-sectional view illustrating the display module 200 according to the fourth embodiment.

In the current embodiments, since other configurations except for a light guide panel are substantially the same as those of the first embodiment, characterized parts of the current embodiments will be principally described.

Unlike the light guide panel of FIG. 2, which is inclined at a preset angle, referring to FIG. 33, the lower surface of the light guide panel 15 according to the second embodiment is flush with the inner surface of the bottom cover 110.

Thus, in the backlight unit 100, the light guide panel 15 according to the current embodiment does not overlap adjacent one of the light guide panels 15.

Unlike the light guide panels 15 of FIG. 33, the light incident part 15b and the light emitting part 15a of which have different thicknesses, referring to FIG. 34, the light guide panel 15 according to the third embodiment has the same thickness.

Unlike the backlight units 100 of FIGS. 2, 33 and 34, each of which includes the light guide panels 15, referring to FIG. 35, the backlight unit 100 according to the fourth embodiment includes only one of the light guide panels 15.

In addition, the substrate 14 and the light sources 13 of the backlight unit 100 according to the current embodiment may be disposed on at least one border of the light guide panel 15.

According to the embodiments, each optical assembly of the backlight unit can be simply manufactured as an assembly including the light source, the light guide panel, and the reflective member. According to the embodiments, the process of assembling the optical assemblies to manufacture the backlight unit is simplified to minimize a loss during the assembling process, thereby improving the productivity.

According to the embodiment, since the module-type backlight unit including the light guide panels is used to provide light to the display panel, the display apparatus is slimmed, and the local driving method such as the local dimming method and the impulsive method is used to improve the contrast ratio of a display image.

In addition, since the reflective member of one optical assembly at least partially overlap the reflective member of another one, light emitted from the optical assemblies can be uniformly and continuously reflected.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
a bottom cover;
a substrate accommodated in the bottom cover;
a plurality of light sources arrayed on the substrate to emit light at a predetermined orientation angle from a first direction;
a plurality of light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part,
at least one reflective member including a reflective region overlapping one of the light guide panels and an extension region that does not overlap the light guide panel; and
an optical sheet disposed above the light guide panel,
wherein adjacent ones of the light guide panels are spaced a predetermined distance from each other to form a space, and
at least one portion of the reflective member disposed on a lower surface of one of the adjacent light guide panels is disposed within the space to prevent an inner surface of the bottom cover from being exposed in the first direction through the space.

2. The backlight unit according to claim 1, wherein the reflective member is parallel to a plane defined by the first direction and a third direction crossing the first direction and the second direction.

3. The backlight unit according to claim 1, wherein at least one portion of one of the light guide panels is disposed above at least one portion of another light guide panel adjacent to the light guide panel.

4. The backlight unit according to claim 1, wherein the extension region of the reflective member disposed under one of the light guide panels overlaps the reflective region of the reflective member disposed under another light guide panel adjacent to the light guide panel.

5. The backlight unit according to claim 1, wherein at least one portion of the extension region of one of the reflective members is disposed under the reflective region of another reflective member adjacent to the reflective member.

6. The backlight unit according to claim 1, wherein the reflective region faces a lower surface of the light guide panel.

7. The backlight unit according to claim 1, wherein the extension region extends to an exterior of a border of the light guide panel and is exposed in the second direction.

8. The backlight unit according to claim 1, further comprising a cover that surrounds both one portion of an upper surface of the light incident part and one portion of a lower surface of the light guide panel to accommodate the light source.

9. The backlight unit according to claim 8, wherein at least one portion of the cover is fixed to the bottom cover.

10. The backlight unit according to claim 8, wherein the cover comprises:
a first cover covering at least one portion of an upper surface of the substrate provided with the light sources; and
a second cover covering at least one portion of a lower surface of the substrate.

11. The backlight unit according to claim 8, wherein a first point of the extension region has a width in a third direction,
the extension region has a second point that is spaced a predetermined distance in an opposite direction to the first direction from the first point, and
the width of the first point is greater than a width of the second point in the third direction.

12. The backlight unit according to claim 1, wherein the backlight unit is divided into a plurality of division driving areas corresponding to the light guide panels, and
brightness of each of the division driving areas is adjusted according to a color coordinate signal or a brightness signal of an image signal.

13. The backlight unit according to claim 1, wherein the extension region of one of the reflective members comprises:
an overlap region that overlaps the extension or reflective region of another reflective member adjacent to the reflective member; and
a non-overlap region that is disposed in the space and does not overlap the adjacent reflective member.

14. The backlight unit according to claim 1, wherein the extension region comprises:

a first extension region that extends in a third direction from a border of the light guide panel, wherein the border crosses the third direction; and a second extension region that extends in the first direction from a border of the light guide panel, wherein the border crosses the first direction.

15. The backlight unit according to claim 1, wherein the extension region comprises:

a first extension region extending in a third direction from a border of the light guide panel, wherein the border crosses the third direction, wherein the first extension region overlaps at least one portion of a reflective member of an optical assembly disposed in the third direction; and a second extension region extending in the first direction from a border of the light guide panel, wherein the border crosses the first direction, wherein the second extension region overlaps at least one portion of an optical assembly disposed in the first direction.

16. A backlight unit comprising:

one or more optical sheets;

a plurality of optical assemblies under the optical sheet; and a bottom cover to which the optical sheet is fixed, the bottom cover accommodating the optical assemblies, wherein the optical assembly includes:

a substrate;

a plurality of light sources arrayed on the substrate to emit light at a predetermined orientation angle from a first direction;

one or more light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part; and a reflective member under the light guide panel, the reflective member including a reflective region that overlaps the light guide panel and an extension region that does not overlap the light guide panel, wherein a border of the light guide panel provided to one of the optical assemblies is spaced a predetermined distance from a border of the light guide panel provided to another optical assembly adjacent to the optical assembly, and at least one portion of the extension region of the reflective member provided to one of the optical assemblies is disposed within the predetermined distance, and another portion of the extension region overlaps at least one portion of the reflective member of another optical assembly adjacent to the optical assembly.

17. A display apparatus comprising:

a display panel;

a backlight unit on a rear surface of the display panel, the backlight unit being divided into a plurality of blocks that are allowed to be separately driven; and a driving part disposed behind the backlight unit to drive at least one of the display panel and the backlight unit, wherein the backlight unit includes:

a bottom cover;

a substrate accommodated in the bottom cover;

a plurality of light sources arrayed on the substrate to emit light at a predetermined orientation angle from a first direction;

a plurality of light guide panels including a light incident part and a light emitting part, wherein the light incident part has a light incident surface to which light is incident in the first direction from the light sources, wherein the light emitting part emits the incident light in a second direction crossing the first direction and has a side connected to the light incident part;

at least one reflective member including a reflective region overlapping one of the light guide panels and an extension region that does not overlap the light guide panel; and an optical sheet disposed above the light guide panel, wherein the reflective member includes:

an overlap region that overlaps the extension or reflective region of another reflective member adjacent to the reflective member; and a non-overlap region that is disposed in a space between the light guide panels and does not overlap the adjacent reflective member.

18. The display apparatus according to claim 17, wherein adjacent ones of the light guide panels are spaced a predetermined distance from each other, and the extension region of the reflective member disposed under one of the adjacent light guide panels is disposed within the predetermined distance to prevent an inner surface of the bottom cover from being exposed in the first direction through the predetermined distance.

19. The display apparatus according to claim 17, wherein the extension region comprises:

a first extension region extending in a third direction from a border of the light guide panel, wherein the border crosses the third direction, wherein the first extension region overlaps at least one portion of the reflective member of another one of the optical assemblies disposed in the third direction; and a second extension region extending in the first direction from a border of the light guide panel, wherein the border crosses the first direction, wherein the second extension region overlaps at least one portion of another one of the optical assemblies disposed in the first direction.

20. The display apparatus according to claim 17, wherein at least one portion of the extension region of one of the reflective members is disposed under the reflective region of another reflective member adjacent to the reflective member.

21. The display apparatus according to claim 17, wherein the display panel is divided into a plurality of division driving areas corresponding to the light guide panels, and brightness of at least one of the light sources corresponding to the light guide panel corresponding to each of the division driving areas is adjusted according to a color coordinate signal or a brightness signal of an image signal, so as to adjust brightness of each of the division driving areas.

* * * * *